US011378513B2

(12) United States Patent
Snik et al.

(10) Patent No.: US 11,378,513 B2
(45) Date of Patent: Jul. 5, 2022

(54) APPARATUS AND METHOD FOR DETERMINING PRESENCE OF A GAS

(71) Applicant: UNIVERSITEIT LEIDEN, Leiden (NL)

(72) Inventors: Frans Snik, Leiden (NL); Christoph Ulrich Keller, Leiden (NL)

(73) Assignee: UNIVERSITEIT LEIDEN, Leiden (NL)

( * ) Notice: Subject to any disclaimer, the term of this patent is extended or adjusted under 35 U.S.C. 154(b) by 0 days.

(21) Appl. No.: 17/052,472

(22) PCT Filed: May 3, 2019

(86) PCT No.: PCT/NL2019/050267
§ 371 (c)(1),
(2) Date: Nov. 2, 2020

(87) PCT Pub. No.: WO2019/212354
PCT Pub. Date: Nov. 7, 2019

(65) Prior Publication Data
US 2021/0131950 A1 May 6, 2021

(30) Foreign Application Priority Data

May 3, 2018 (NL) ...................................... 2020863

(51) Int. Cl.
*G01N 21/21* (2006.01)
*G01N 21/31* (2006.01)
G01N 21/17 (2006.01)

(52) U.S. Cl.
CPC ............. *G01N 21/21* (2013.01); *G01N 21/31* (2013.01); *G01N 2021/1795* (2013.01); *G01N 2201/0616* (2013.01)

(58) Field of Classification Search
CPC ................... G01N 21/21; G01N 21/31; G01N 2021/1795; G01N 2201/0616; G01J 3/433; G01J 3/447; G01J 4/04
(Continued)

(56) References Cited

U.S. PATENT DOCUMENTS 3,692,385 A * 9/1972 Gievers .................. G01C 19/04
359/247
5,013,153 A 5/1991 Disch et al.
(Continued)

FOREIGN PATENT DOCUMENTS

| EP | 0359213 A2 | 3/1990 |
| EP | 3076160 A1 | 10/2016 |
| WO | 2016/076724 A2 | 5/2016 |

OTHER PUBLICATIONS

Snik, et al., "FlySPEX: a flexible multi-angle spectropolarimetric sensing system." Polarization: Measurement, Analysis, and Remote Sensing XII. vol. 9853. International Society for Optics and Photonics, 2016.

*Primary Examiner* — Roy M Punnoose
(74) *Attorney, Agent, or Firm* — Nixon Peabody LLP; Ronald I. Eisenstein; Nicole D. Kling

(57) ABSTRACT

Apparatus (100) for determining presence of a gas (103) is provided, the apparatus (100) comprising: one or more retarders (109) to spectrally modulate polarisation of received radiation in accordance with a plurality of polarised spectral modulation profiles which are offset in phase from each other, the radiation output from the one or more retarders (109) comprising radiation having polarisation spectrally modulated in accordance with the said plurality of polarised spectral modulation profiles in a common beam of radiation; one or more polarisers (147, 148); and radiation detectors (142, 144) to detect radiation output from the one or more retarders (109) filtered for respective polarisation (Continued)

states by the one or more polarisers (147, 148), the detectors (142, 144) selectively and separately detecting on different detectors at the same time polarised radiation conforming to each of at least first and second of the said polarised spectral modulation profiles to thereby provide at least respective first and second polarisation-dependent radiation intensity measurements from which the presence of the gas (103) can be determined.

19 Claims, 14 Drawing Sheets

(58) Field of Classification Search
USPC .......................................................... 356/364
See application file for complete search history.

(56) References Cited

U.S. PATENT DOCUMENTS

| | | | |
|---|---|---|---|
| 5,696,586 A | 12/1997 | Ivanov | |
| 7,253,896 B1 * | 8/2007 | Novikov | G01J 3/433 |
| | | | 356/327 |
| 2005/0207943 A1 * | 9/2005 | Puzey | C12Q 1/04 |
| | | | 422/82.05 |
| 2015/0355022 A1 * | 12/2015 | Keller | G01J 1/4228 |
| | | | 356/366 |
| 2018/0283949 A1 * | 10/2018 | Visser | G01N 33/0027 |
| 2018/0284013 A1 * | 10/2018 | van Brug | G01J 3/447 |

\* cited by examiner

APPARATUS AND METHOD FOR DETERMINING PRESENCE OF A GAS

CROSS REFERENCE TO RELATED APPLICATIONS

This Application is a 35 U.S.C. § 371 National Phase Entry of International Patent Application No. PCT/NL2019/050267 filed May 3, 2019, which designates the U.S. and claims benefit of foreign priority under 35 U.S.C. § 119(b) of NL Application Number 2020863 filed May 3, 2018, the contents of which are incorporated herein in their entireties by reference.

TECHNICAL FIELD

Embodiments described herein generally relate to determining presence of a gas. More particularly, although not exclusively, embodiments relate to obtaining polarisation-dependent radiation intensity measurements from which the presence of a gas may be determined. Some embodiments relate to remotely determining presence of a gas. Some embodiments relate to determining the concentration of the gas.

BACKGROUND

Remote sensing of gases in the Earth's atmosphere is essential for air pollution monitoring, source detection and gas leak detection. Many optical gas sensing instruments are based on spectroscopic measurements in which trace gases such as $NO_2$ or $CH_4$, can be detected through their specific spectral features. In order to achieve a two-dimensional image of the presence of trace gas it is common for a spectrometer to use a scanning mechanism in which the field of view can be scanned in both a spatial and a spectral domain. A scanning mechanism may require substantial time for the 2D image to be built up. Other mechanisms for obtaining a 2D image of trace gas concentration include hyperspectral imaging and compressive sensing techniques. Such methods may implement a dispersive or wavelength-selective element to obtain an inherent spectral resolution sufficient to discern the spectral features of the gas.

Multi Axis Differential Optical Absorption Spectroscopy (MAX-DOAS) instruments can be used to determine concentrations of gases in the atmosphere by utilising scattered sunlight from multiple viewing directions. The scattered sunlight may be detected using spectrographs which may collect light through an optical fibre and scan the sky to record complete spectral features in all directions. Instruments which use optical fibre may have several viewing directions at the same time. In scanning systems, the entire system (including optical fibres) may be pointed towards the target area to prevent transmission differences from causing erroneous readings.

A further example of gas detection involves using a multiple optical path intensity based interferometer method such as a using a Michelson Interferometer or a Fourier Transform Spectrometer, where an incoming beam of radiation is split into two physically separate independent arms before being recombined. A yet further example involves the use of a Mach-Zender interferometer which utilises different optical paths and has two outputs which are out of phase with each other by 180°. Due to the complex optical system associated with such interferometers, they are prone to become misaligned and are particularly sensitive to vibrations. The multiple optical paths in such interferometers may mean that small misalignments or movements may lead to erroneous measurements. Vibrations and temperature changes can affect different optical paths differently. As a result, such interferometric techniques may be considered unsuitable in many environments, such as for an example in a drone, satellite or any moving vehicle, when a large amount of stabilisation may be required. Furthermore, such interferometers with multiple physically separate optical paths are highly sensitive to temperature and vibration changes, or require regular scanning of the interferometer path length, resulting in temperature and vibration stabilisation being required. The stabilisation requirements and sensitive alignments lead to a bulky set-up. There is thus a need for a compact and robust imaging apparatus for detecting gases.

SUMMARY

A first aspect of the disclosure provides an apparatus for determining presence of a gas. The apparatus typically comprises one or more retarders to spectrally modulate, typically within a selected frequency range, polarisation of received (typically electromagnetic) radiation in accordance with a plurality of polarised spectral modulation profiles which are offset in phase from each other. The apparatus typically comprises one or more radiation detectors to detect radiation output from the one or more retarders filtered for a respective polarisation state by one or more polarisers, the one or more detectors selectively (and typically separately— e.g. on the same detector at a different time or on different detectors at the same time or at different times) detecting polarised radiation conforming to each of at least first and second of the said polarised spectral modulation profiles to thereby provide at least respective first and second polarisation-dependent radiation intensity measurements from which the presence of the gas can be determined.

It may be that the apparatus comprises one or more polarisers.

It may be that the apparatus comprises radiation detectors to detect radiation output from the one or more retarders filtered for respective polarisation states by the one or more polarisers, the detectors selectively and separately detecting on different detectors at the same time polarised radiation conforming to each of at least first and second of the said polarised spectral modulation profiles to thereby provide at least respective first and second polarisation-dependent radiation intensity measurements from which the presence of the gas can be determined.

Thus, it may be that the radiation detectors comprise at least first and second radiation detectors to selectively, separately and simultaneously detect polarised radiation filtered for respective polarisation states, the polarised radiation detected by each of the at least first and second radiation detectors conforming to a different one of the said polarised spectral modulation profiles, to thereby provide respective polarisation-dependent radiation intensity measurements from which the presence of the gas can be determined.

It may be that the apparatus further comprises a filter to selectively transmit received radiation having a frequency within the selected frequency range. Typically the gas has a plurality of spectral features offset in frequency from each other within the selected frequency range. For example, an absorption or emission spectrum of the gas may have a plurality of absorption or emission lines offset in frequency from each other within the selected frequency range.

A second aspect of the disclosure provides a method for determining presence of a gas. The method typically comprises: one or more retarders spectrally modulating, typically within a selected frequency range, polarisation of received (typically electromagnetic) radiation in accordance with a plurality of polarised spectral modulation profiles which are offset in phase from each other. The method typically further comprises selectively detecting radiation output from the one or more retarders filtered for a respective polarisation state by one or more polarisers and conforming to each of at least first and second of the said polarised spectral modulation profiles to thereby provide at least respective first and second polarisation-dependent radiation intensity measurements. The method typically further comprises determining the presence of the gas based on the at least first and second polarisation dependent radiation intensity measurements.

It may be that the method comprises radiation detectors detecting radiation output from the one or more retarders filtered for respective polarisation states by one or more polarisers, the radiation detectors selectively and separately detecting on different detectors at the same time polarised radiation conforming to each of at least first and second of the said polarised spectral modulation profiles to thereby provide at least respective first and second polarisation-dependent radiation intensity measurements, and determining the presence of the gas based on the at least first and second polarisation dependent radiation intensity measurements.

It may be that the method further comprises selectively transmitting received radiation having a frequency within the selected frequency range. Typically the gas has a plurality of spectral features offset in frequency from each other within the selected frequency range. For example, an absorption or emission spectrum of the gas may have a plurality of absorption or emission lines offset in frequency from each other within the selected frequency range.

By providing one or more retarders to spectrally modulate polarisation of received radiation in accordance with a plurality of polarised spectral modulation profiles which are offset in phase from each other, and selectively (and typically separately) detecting polarised radiation conforming to each of at least first and second of the said polarised spectral modulation profiles, a compact arrangement can be provided which enables polarisation-dependent radiation intensity measurements to be performed from which the presence of the gas can be determined. Such an apparatus can also be provided with a tolerable sensitivity to ambient temperature changes without having to stabilise the temperature of the apparatus itself. By providing apparatus with tolerable sensitivity to ambient temperature changes, any calibration required for the apparatus is more robust and does not need to be repeated for every change in ambient temperature. The apparatus is also more tolerant to vibration. As the polarisation of received radiation is spectrally modulated in accordance with the polarised spectral modulation profiles by the one or more retarders, two polarised components of the same beam of the received radiation travel along essentially the same trajectory with a path length difference. Intensity modulation of the beam of received radiation (typically in accordance with a said polarised spectral modulation profile) may then be obtained by a polariser filtering the radiation output by the one or more retarders for a respective polarisation state. Accordingly, an interferometer with multiple optical paths is not required in order to provide the radiation with the said plurality of polarised spectral modulation profiles, which helps the apparatus to have more tolerable temperature and vibration sensitivity. By contrast, splitting the beam into two arms and recombining using a classical interferometric method such as a Michelson interferometer, or using a Mach-Zender interferometer having more than one optical path, provides a larger scope for errors due to properties of the multiple optical paths varying differently with temperature and vibrations.

Typically the radiation output from the one or more retarders comprises radiation having polarisation spectrally modulated in accordance with the said plurality of polarised spectral modulation profiles in a common beam of radiation. Typically the radiation filtered for a respective polarisation state and conforming to the first said polarised spectral modulation profile is filtered from a beam of radiation comprising radiation having polarisation spectrally modulated in accordance with the at least first and second said polarised spectral modulation profiles (and typically similarly for the radiation filtered for a respective polarisation state and conforming to the second polarised spectral modulation profile). By providing radiation having polarisation spectrally modulated in accordance with the said plurality of polarised spectral modulation profiles in a common beam of radiation, the radiation modulated in accordance with each of the polarised spectral modulation profiles follows substantially the same optical path from the one or more retarders to the detectors. This helps to keep the apparatus compact and avoids the need for multiple discrete optical paths, thereby helping to improve the tolerance of the apparatus to temperature changes and vibration.

By the radiation detectors selectively and separately detecting on different detectors at the same time polarised radiation conforming to each of the at least first and second of the said polarised spectral modulation profiles, the number of moving parts of the apparatus can be reduced, making the apparatus more robust and reliable. In addition, more sensitive and accurate gas detection can be achieved at least because the at least first and second polarisation dependent radiation intensity measurements are made under the same temperature, vibration, optical alignment and gas concentration conditions.

It may be that the one or more retarders is to spectrally modulate polarisation of received radiation in accordance with the plurality of polarised spectral modulation profiles by causing frequency dependent interference between orthogonal polarisation components of received radiation.

It will be understood that, when it is mentioned that radiation may be detected which conforms to at least first and second of the said polarised spectral modulation profiles on different detectors at the same time, the different detectors may be different in the sense that they are discrete from each other, but they may otherwise be substantially the same type of detector. The different detectors may be different pixels on the same array of radiation detectors, such as a two-dimensional array of radiation detectors.

It may be that the polarised spectral modulation profiles are linearly polarised spectral modulation profiles. It may be that the one or more radiation detectors detect radiation output from the one or more retarders filtered for a respective linear polarisation state. It may be that the one or more detectors selectively (and typically separately, for example on different detectors at the same time) detect linearly polarised radiation conforming to each of at least first and second of the said polarised spectral modulation profiles to thereby provide at least respective first and second polarisation-dependent radiation intensity measurements from which the presence of the gas can be determined.

It may be that the one or more polarisers comprise one or more polarising beam splitters which each provide at separate outputs polarised radiation at different predefined (e.g.

orthogonal) linear polarisations, for example to respective detectors. It may be that the one or more polarisers comprise a plurality of linear polarising filters which each have a single output to provide radiation having a single predefined linear polarisation, for example to a respective detector.

Typically, when polarisation of radiation is spectrally modulated by the one or more retarders in accordance with each of a plurality of polarised spectral modulation profiles, the polarisation of radiation is spectrally modulated such that, when the spectrally modulated radiation is filtered at a polarisation angle corresponding to a respective said polarised spectral modulation profile, the intensity of the filtered radiation varies (typically substantially periodically) with frequency of radiation in accordance with that profile. Typically each of the polarised spectral modulation profiles, and thus the intensity of the radiation filtered at a polarisation angle corresponding to that polarised spectral modulation profile, comprises alternating maxima and minima which are substantially periodic with frequency of radiation, typically within the selected frequency range. Typically the maxima and minima of the first said polarised spectral modulation profile are offset in phase from the maxima and minima of the second said polarised spectral modulation profile. It may be that the maxima and minima are interference maxima and minima caused by frequency dependent interference between orthogonal polarisation components caused by the one or more retarders.

Typically the said polarised spectral modulation profiles have alternating maxima and minima which are substantially periodic with frequency of radiation, typically within the selected frequency range, the frequency spacing between successive maxima being substantially equal to the frequency spacing between peaks of a pair of spectral features of the gas within the selected frequency range. It may be that the first polarised spectral modulation profile has successive minima the frequency spacing between which is substantially equal to the frequency spacing between peaks of a pair of spectral features of the gas within the selected frequency range. It may be that the respective minima of the first polarised spectral modulation profile substantially do not overlap with the peaks of the respective spectral features of the gas in the selected frequency range.

It may be that the spectral features are absorption lines or emission lines of the gas.

It may be that a plurality of spectral features of the gas within the selected frequency range are at least quasi-periodic or periodic. It may be that the maxima and minima of the polarised spectral modulation profiles are provided with a frequency spacing which is substantially equal to the frequency spacing between peaks of spectral features of the said plurality of spectral features within the selected frequency range. It may be that the first polarised spectral modulation profile has successive maxima the frequency spacing between which is substantially equal to the frequency spacing between peaks of a pair of spectral features of the gas within the selected frequency range. It may be that a plurality of the respective maxima of the first polarised spectral modulation profile substantially overlap with the respective spectral features (preferably the peaks of the spectral features) of the gas within the selected frequency range corresponding to the said (e.g. absorption) peaks. The closer the period between maxima (and the period between minima) of the polarised spectral modulation profiles to the period between peaks of spectral features of the gas, the more sensitive the resulting fractional linear polarisation to the presence of the gas.

It may be that the first polarised spectral modulation profile is substantially 180° out of phase with the second polarised spectral modulation profile. It may be that the second polarised spectral modulation profile has successive maxima the frequency spacing between which is substantially equal to the frequency spacing between peaks of a pair of spectral features of the gas within the selected frequency range. It may be that the respective maxima of the second polarised spectral modulation profile substantially do not overlap with the respective peaks of the spectral features of the gas within the selected frequency range.

It may be that the one or more retarders comprise one or more retarder elements and a quarter wave plate. It may be that the one or more retarders comprise one or more retarder elements to provide received radiation with components which are linearly polarised at linear polarisation angles of 0° and 90° and components which are right and left hand circularly polarised. It may be that the one or more retarders comprise a quarter wave plate. It may be that the quarter wave plate is to convert the components of the radiation output by the retarder elements having linear polarisation angles of 0° and 90° and right and left hand circularly polarisation to linearly polarised components at linear polarisation angles of 0°, 45°, 90° and 135°. It may be that the one or more retarder elements and quarter waveplate (where provided) together provide the received radiation with components which are linearly polarised at linear polarisation angles of 0°, 45°, 90° and 135°. These linear polarisation angles may relate to modulation phases of 0°, 90°, 180° and 270°.

It may be that the plurality of polarised spectral modulation profiles comprises at least three polarised spectral modulation profiles offset in phase from each other.

It may be that the plurality of polarised spectral modulation profiles comprises at least four polarised spectral modulation profiles offset in phase from each other.

It may be that the one or more detectors selectively (and typically separately, for example on different detectors at the same time) detect (or it may be that the method comprises selectively detecting, for example on different detectors at the same time) polarised radiation conforming to each of at least first, second and third of the said polarised spectral modulation profiles to thereby provide at least respective first, second and third polarisation-dependent radiation intensity measurements from which the presence of the gas can be determined.

It may be that the radiation detectors comprise at least first, second and third radiation detectors to selectively, separately and simultaneously detect polarised radiation filtered for respective polarisation states, the polarised radiation detected by each of the at least first, second and third radiation detectors conforming to a different one of the said polarised spectral modulation profiles, to thereby provide respective polarisation-dependent radiation intensity measurements from which the presence of the gas can be determined.

The fractional linear polarisation of the detected radiation, and thus the presence of the gas, can be determined from the respective at least first, second and third polarisation-dependent radiation intensity measurements to thereby determine presence (and typically absorption or emission strength or concentration) of the gas without any of the first, second and third of the said polarised spectral modulation profiles having to be aligned with the absorption lines of the gas. This helps to further reduce the temperature sensitivity of the apparatus as temperature dependent spectral shifts of the polarised spectral modulation profiles can be more easily tolerated.

It will be understood that the more distributed the relative phases of the first, second and third of the said polarised spectral modulation profiles throughout a 360° cycle, the more efficiently the fractional linear polarisation can be determined based on the at least first, second and third polarisation-dependent radiation intensity measurements. Accordingly, preferably respective ones of the first, second and third polarisation-dependent spectral modulation profiles which are adjacent to each other in phase are offset in phase from each other by substantially 120°. Preferably, the fractional linear polarisation determined by the controller is at least 5% of the average (e.g. mean) relative absorption depth of the spectral features of the gas within the selected frequency range.

It may be that each of the at least first, second and third polarised spectral modulation profiles have a plurality of maxima in the selected frequency range which do not align (or overlap) with peaks of spectral features of the gas in the selected frequency range.

It may be that the one or more detectors selectively (and typically separately, for example on different detectors at the same time) detect (or it may be that the method comprises one or more detectors selectively detecting, for example on different detectors at the same time) polarised radiation conforming to each of at least first, second, third and fourth of the said polarised spectral modulation profiles to thereby provide at least respective first, second, third and fourth polarisation-dependent radiation intensity measurements from which the presence of the gas can be determined.

It may be that the radiation detectors comprise at least first, second, third and fourth radiation detectors to selectively, separately and simultaneously detect polarised radiation filtered for respective polarisation states, the polarised radiation detected by each of the at least first, second, third and fourth radiation detectors conforming to a different one of the said polarised spectral modulation profiles, to thereby provide respective polarisation-dependent radiation intensity measurements from which the presence of the gas can be determined.

It may be that respective ones of the first, second, third and fourth polarisation-dependent spectral modulation profiles which are adjacent to each other in phase are offset in phase from each other by substantially 90°.

It may be that each of the at least first, second, third and fourth polarised spectral modulation profiles have a plurality of maxima in the selected frequency range which do not align (or overlap) with peaks of spectral features of the gas in the selected frequency range.

It may be that the one or more detectors selectively (and typically separately) detect (or it may be that the method comprises one or more detectors selectively detecting) polarised radiation conforming to each of at n said polarised spectral modulation profiles to thereby provide at least respective n polarisation-dependent radiation intensity measurements from which the presence of the gas can be determined.

It may be that respective ones of the n polarisation-dependent spectral modulation profiles which are adjacent to each other in phase are offset in phase from each other by substantially 360/n°.

It may be that n is, for example, an integer greater than or equal to two, greater than equal to three, greater than equal to four or greater than equal to eight.

It may be that the respective maxima of the polarised spectral modulation profiles to which the radiation selectively detected by the one or more detectors conform substantially do not overlap with the respective peaks of the spectral features of the gas in the selected frequency range.

It may be that the one or more retarders are to spectrally modulate the linear polarisation state of the received radiation to provide the received radiation with a plurality of polarised spectral modulation profiles which are offset in phase from each other. It may be that each of the said plurality of polarised spectral modulation profiles is associated with a different linear polarisation angle (typically such that when the spectrally modulated radiation is filtered at the linear polarisation angle associated with a respective said polarised spectral modulation profile, the intensity of the filtered radiation varies (typically substantially periodically) with the frequency of radiation in accordance with that profile).

It may be that radiation incident on the one or more retarders at different angles of incidence is modulated by the one or more retarders (typically one or more birefringent elements) in accordance with respective different polarised spectral modulation profiles which are offset in phase from each other (or it may be that the method comprises the one or more retarders modulating radiation incident on the one or more retarders at different angles of incidence in accordance with respective different polarised spectral modulation profiles which are offset in phase from each other), the said different polarised spectral modulation profiles being associated with the same (typically linear) polarisation angle.

It may be that the one or more retarders are to spectrally modulate the linear polarisation state of the received radiation in accordance with different polarised spectral modulation profiles for different angles of incidence of the radiation on the one or more retarders.

It may be that the one or more retarders are to apply a combination of modulations, such as spectral modulations, to the received radiation, such as to the polarisation of the received radiation, in different modulation domains. For example it may be that the one or more retarders are to apply any combination of the following modulations to received radiation: to spectrally modulate the linear polarisation state of the received radiation to provide the received radiation with a plurality of polarised spectral modulation profiles which are offset in phase from each other, each of which is associated with a different linear polarisation angle; to spectrally modulate the linear polarisation state of the received radiation in accordance with different polarised spectral modulation profiles for different angles of incidence of the radiation on the one or more retarders (e.g. for radiation of the same linear polarisation angle); to modulate the polarisation state of radiation output by the one or more retarders (e.g. periodically) over time.

It may be that the apparatus is to apply a plurality of polarisation modulations to the received radiation, the plurality of polarisation modulations comprising the one or more retarders spectrally modulating the linear polarisation state of the received radiation to provide the received radiation with a plurality of polarised spectral modulation profiles which are offset in phase from each other, each of which is associated with a different linear polarisation angle, and any one or more of: the one or more retarders spectrally modulating the linear polarisation state of the received radiation in accordance with different polarised spectral modulation profiles for different angles of incidence of the radiation on the one or more retarders (e.g. for radiation of the same linear polarisation angle); the apparatus modulating the polarisation state of radiation output by the one or more retarders differently (e.g. periodically) over time; the apparatus spatially modulating the received radiation by a plurality of groups of radiation detectors detecting radiation output from the one or more retarders, each of the groups of detectors comprising radiation detectors to detect radiation output from the one or more retarders filtered for respective polarisation states by one or more polarisers, the radiation detectors selectively and separately detecting on different detectors at the same time polarised radiation conforming to each of at least first and second of the said polarised spectral modulation profiles to thereby provide at least respective first and second polarisation-dependent radiation intensity measurements from which the presence of the gas can be determined, the respective groups of radiation detectors being offset from each other, for example in a common focal plane. It may be that the respective groups of radiation detectors are offset from each other in a periodic tessellated arrangement, the periodicity of the tessellated arrangement being in respect of the linear polarisation angles of radiation which the detectors of the groups are configured to detect.

It may be that the spectral polarisation modulation provided by the one or more retarders provides the received radiation with the polarised spectral modulation profiles which allow the presence of gas to be determined, while the additional angular, temporal and/or spatial modulation(s) helps to improve the accuracy with which radiation conforming to those profiles can be measured.

It may be that the radiation detectors and the one or more polarisers are provided by a pixelated polarisation camera. It may be that the pixelated polarisation camera is to perform the said spatial modulation.

Although gas detection can be performed by way of modulation in a single modulation domain (for example the spectral modulation applied by the one or more retarders to provide the radiation with polarised spectral modulation profiles offset in phase with each other, the different polarised spectral modulation profiles being associated with different linear polarisation angles), by adding modulations in different modulation domains to the radiation, systematic errors, for example in a fractional linear polarisation measurement or in the polarisation-dependent intensity measurements from which the presence of the gas is determined can be reduced or removed. This enables more accurate, and more sensitive, polarisation measurements and thus gas detection.

It may be that the detected radiation conforming to at least one of the said at least first and second polarised spectral modulation profiles is radiation filtered for a first linear polarisation angle and wherein the detected radiation conforming to at least one of the said at least first and second polarised spectral modulation profiles is radiation filtered for a second linear polarisation angle different from the first linear polarisation angle.

It may be that the second linear polarisation angle is offset from the first linear polarisation angle by substantially 90° (e.g. between 80° and 100°, or between 85° and 95° or between 88° and 92° or between 89° and 91°). This provides a substantially 180° phase difference between the polarised spectral modulation profiles associated with the first and second linear polarisation angles, thereby enabling the maxima of one of the polarised spectral modulation profiles to be aligned with peaks of the spectral features of the gas while the maxima of the other polarised spectral modulation profile are aligned with portions of the spectrum of the gas off the said peaks.

It may be that detected radiation conforming to at least one of the at least first and second polarised spectral modulation profiles is radiation polarised at a first linear polarisation angle which was incident on a first of the said one or more retarders at a first angle of incidence, and wherein the detected radiation conforming to at least one of the at least first and second polarised spectral modulation profiles is radiation polarised at the said first linear polarisation angle which was incident on the said first of the said one or more retarders at a second angle of incidence different from the first angle of incidence.

It may be that the apparatus comprises one or more radiation detectors to selectively detect radiation output from the one or more retarders filtered for a respective polarisation state by one or more polarisers, the one or more detectors selectively detecting polarised radiation conforming to each of a plurality of the said polarised spectral modulation profiles to thereby provide a respective plurality of polarisation-dependent radiation intensity measurements from which the presence of the gas can be determined. Typically the plurality of polarised spectral modulation profiles are offset in phase from each other. It may be that the said plurality of polarised spectral modulation profiles comprise a plurality of polarised spectral modulation profiles associated with each of a plurality of different polarisations (typically a plurality of linear polarisations), the said plurality of polarised spectral modulation profiles associated with each of the plurality of different polarisations being associated with radiation incident on the one or more retarders at different angles of incidence.

It may be that the one or more retarders comprise a temporal polarisation modulator (e.g. rotating half waveplate or switching liquid crystal) to (typically cyclically) vary the (typically linear) polarisation state (or it may be that the method comprises a temporal polarisation modulator (typically cyclically) varying the (typically linear) polarisation state) of the radiation output from the one or more retarders with respect to time. It may be that the temporal polarisation modulator sequentially allows linearly polarised radiation at different angles of linear polarisation to pass through the combination of the temporal polarisation modulator and the one or more (typically fixed angle linear) polarisers onto the said one or more radiation detectors. Thus, the one or more radiation detectors detecting radiation filtered for a particular polarisation state can detect radiation in accordance with different said polarised spectral modulation profiles over time. It may be that the temporal modulation modulator is provided in addition to one or more retarders that perform spectral modulation of the received radiation, the spectral modulation providing the received radiation with a plurality of polarised spectral modulation profiles offset in phase with each other, each of the said polarised spectral modulation profiles being associated with a different linear polarisation angle.

It may be that the one or more radiation detectors comprise a plurality of radiation detectors.

It may be that the plurality of radiation detectors include at least one respective radiation detector for (or it may be that the method comprises a plurality of radiation detectors including at least one respective radiation detector) detecting radiation conforming to each of the respective at least first and second polarised spectral modulation profiles. It may be that the said plurality of radiation detectors are provided in a tessellated arrangement.

It may be that the apparatus comprises a plurality of (typically fixed angle) linear polarisers, each to receive (or it may be that the method comprises a plurality of (typically fixed angle) linear polarisers each receiving) radiation having spectrally modulated polarisation from the one or more retarders and output (or outputting) linearly polarised radiation (e.g. at a respective linear polarisation angle) to a respective radiation detector of the said plurality of radiation detectors, typically to provide respective polarisation dependent intensity measurements from which presence of the gas can be determined. It may be that the plurality of linear polarisers comprise linear polarisers of different linear polarisation angles.

It may be that the linear polarisers of the said plurality are provided on a common focal plane.

It may be that the linear polarisers of the said plurality are offset from each other, for example in the common focal plane.

It may be that the plurality of linear polarisers are provided in a tessellated arrangement.

It may be that the one or more polarisers are provided over corresponding detectors.

It may be that the linear polarisers of the plurality of linear polarisers are provided over the corresponding detectors.

It may be that the said plurality of radiation detectors are provided on a common focal plane.

It may be that the radiation detectors of the said plurality are offset from each other, for example in the common focal plane.

It may be that the one or more radiation detectors comprise one or more radiation detectors each to sequentially detect (or it may be that the method comprise one or more radiation detectors each sequentially detecting) radiation filtered for respective different angles of linear polarisation. It may be that the radiation detector is to detect (or it may be that he method comprises the radiation detector detecting) radiation filtered for a first angle of linear polarisation to thereby obtain the first polarisation dependent intensity measurement, and to subsequently detect (or subsequently detecting) radiation filtered for a second angle of linear polarisation different from the first angle to thereby obtain the second polarisation dependent intensity measurement.

It may be that the apparatus comprises an adjustable (e.g. rotating) linear polariser (i.e. adjustable to thereby adjust the linear polarisation angle of the linear polariser), or a combination of a temporal polarisation modulator and a fixed angle linear polariser together, to receive (or it may be that the method comprises an adjustable (e.g. rotating) linear polariser receiving) radiation having spectrally modulated polarisation from the one or more retarders to sequentially allow (or sequentially allowing) linearly polarised radiation at different angles of linear polarisation to pass through the adjustable linear polariser, or through the said combination of the temporal polarisation modulator and fixed angle linear polariser, onto the said one or more radiation detectors. Thus, the one or more radiation detectors can detect radiation in accordance with different said polarised spectral modulation profiles over time.

It may be that the one or more retarders are arranged in an athermal combination. For example, it may be that the one or more retarders comprise a plurality of retarder (e.g. birefringent) elements at least two of which have different retardances (e.g. birefringences), the said plurality of retarder (e.g. birefringent) elements being combined such that temperature dependent variations in retardance (e.g. birefringence) of the said plurality of retarder (e.g. birefringent) elements at least substantially cancel out. It may be that the said at least two retarder (e.g. birefringent) elements have retardances which have different relative temperature-dependences (as determined by the coefficient of thermal expansion and the thermo-optic coefficients for $n_e$ and $n_o$). It may be that the at least two retarder elements comprise at least two birefringent elements each comprising fast and slow axes, and it may be that the fast axis of a first said birefringent element is aligned with the slow axis of a second birefringent element. It may be that the birefringence of the first said birefringent element is different from the birefringence of the second birefringent element. It may be that the change with temperature of the path length difference between the fast and slow axes of the first said birefringent element is substantially equal to the change with temperature of the path length difference between the fast and slow axes of the second said birefringent element.

By arranging the one or more retarders in an athermal combination, it can be ensured that the alignment between the maxima of the first polarised spectral modulation profile and the peaks of spectral features of the gas (and the alignment between the maxima of the second polarised spectral modulation profile with portions of the spectrum of the gas off the said peaks) remains stable with changes in temperature of the apparatus. This helps to enable the presence of gas to be determined from two polarisation-dependent intensity measurements. When more than two polarisation-dependent intensity measurements are provided, such alignment is not necessary. However, the athermal combination can still help to improve the accuracy of measurements, for example by reducing or eliminating measurement errors caused by temperature fluctuations causing corresponding fluctuations in retardances of the one or more retarders.

It may be that the filter comprises a bandpass filter. It may be that the filter comprises an interference filter.

It may be that the filter comprises one or more birefringent filters. It may be that the filter comprises one or more retarder (e.g. birefringent) elements and one or more polarisers. It may be that the filter comprises one or more retarders in an athermal combination. For example, as above, it may be that the one or more retarders of the filter comprise a plurality of retarder (e.g. birefringent) elements at least two of which have different retardances (e.g. birefringences), the said plurality of retarder (e.g. birefringent) elements being combined such that temperature dependent variations in retardance (e.g. birefringence) of the said plurality of retarder (e.g. birefringent) elements at least substantially cancel out.

It may be that the filter comprises a bandpass (e.g. interference) filter and one or more birefringent filters. It may be that a transmission response of the one or more birefringent filters has transmission minima at the lower and upper cut-off frequencies of the bandpass filter. It may be that the one or more birefringent filters shape the combined transmission profile of the bandpass filter and the one or more birefringent filters between the said transmission minima.

It may be that the one or more retarders comprise one or more birefringent elements, wherein the one or more birefringent filters comprise one or more birefringent elements, and wherein the overall temperature dependence of the retardance of the birefringent elements of the one or more retarders is substantially matched to the overall temperature dependence of the retardance of the birefringent elements of the one or more birefringent filters. It may be that the temperature dependence of the one or more retarders and/or the temperature dependence of the one or more birefringent elements of the one or more birefringent filter(s) match the temperature dependence of the bandpass (e.g. interference) filter.

It may be that the radiation received by the apparatus is (e.g. linearly) polarised, or it may be that the radiation received by the apparatus is unpolarised or it may be that the radiation received by the apparatus is partially polarised. It may be that the apparatus further comprises a linear polariser to receive radiation and output linearly polarised radiation to the one or more retarders.

It may be that the apparatus further comprises a controller configured to determine presence of the gas based on the at least first and second polarisation-dependent intensity measurements. For example, it may be that the controller is configured to compare the first polarisation-dependent intensity measurement to the second polarisation-dependent intensity measurement to thereby determine the presence of the gas. It may be that the controller is configured to determine a gas detection measurement based on the at least first and second polarisation-dependent intensity measurements.

It will be understood that the controller typically comprises a hardware processor. Typically the controller comprises data acquisition circuitry in data communication with processing circuitry, or a hardware computer processor executing computer program code (which is typically provided in a computer memory in data communication with the hardware processor) causing the hardware computer processor, to receive and process the polarisation-dependent intensity measurements in accordance with the functionality of the controller as set out herein.

It may be that the controller is to determine (or it may be that the method comprises determining) fractional linear polarisation data relating to the fractional linear polarisation of the radiation output by the one or more retarders, typically based on the polarisation-dependent intensity measurements. For example, it may be that the controller is to determine (or it may be that the method comprises determining) fractional polarisation data relating to a fractional linear polarisation of the radiation output by the one or more retarders based on the polarisation-dependent intensity measurements by: determining $Q_{meas}$, $U_{meas}$ and $I_{meas}$ based on the polarisation-dependent intensity measurements; determining $Q_{meas}/I_{meas}$ and $U_{meas}/I_{meas}$ from the determined $Q_{meas}$, $U_{meas}$ and $I_{meas}$; applying a transformation to the [$Q_{meas}$, $U_{meas}$] co-ordinate system to provide a transformed co-ordinate system [$Q_{meas}$s, $U_{meas}$] whereby $Q_{meas}'/I_{meas}>0$ and $U_{mea}a_{meas}=0$; and determining the fractional linear polarisation data based on $Q_{meas}'/I_{meas}$.

where: $Q_{meas}$ is the measured polarisation at 0°/90° of a Stokes vector derived from the polarisation-dependent radiation intensity measurements.

$U_{meas}$ is the measured polarisation at 45°/135° of a Stokes vector derived from the polarisation-dependent radiation intensity measurements.

$I_{meas}$ is the measured intensity of a Stokes vector derived from the polarisation-dependent radiation intensity measurements.

It may be that applying the transformation comprises taking into account a zero target gas concentration reference. It may be that the zero target gas concentration reference relates to a measure of the fractional linear polarisation of the radiation output by the one or more retarders for a zero target gas concentration in the target gas measurement volume. It may be that the zero target gas concentration reference is a temperature dependent zero target gas concentration reference. For example, the zero target gas concentration reference may be dependent on the temperature of the apparatus when the polarisation-dependent intensity measurements were made. It may be that the method comprises measuring the temperature of the apparatus (e.g. or the temperature of the one or more retarders), selecting a zero target gas concentration reference in dependence on the measured temperature, and determining the fractional linear polarisation data taking into account the selected zero target gas concentration reference.

Thus, it may be that the fractional linear polarisation data comprises a measure of the fractional linear polarisation of the radiation output by the one or more retarders. It may be that the measure of the fractional linear polarisation of the radiation output by the one or more retarders is with respect to a zero target gas concentration reference which may be dependent on the temperature of the apparatus (in particular, the temperature of the one or more retarders) when the polarisation dependent radiation intensity measurements were made.

It may be that the apparatus is designed to provide a negligible $U_{meas}$ (e.g. by not providing polarised radiation at linear polarisation angles of 45° and 135°). In this case, it may be that the fractional linear polarisation can be determined from $Q_{meas}/I_{meas}$.

It may be that the controller is configured to determine the presence of the gas based on the fractional linear polarisation data.

It may be that the controller is configured to determine (or it may be that the method comprises determining) an absorption or emission strength or concentration (e.g. a column integrated concentration in an atmospheric volume) of the gas based on the said fractional linear polarisation data. It may be that the controller is configured to determine (or it may be that the method comprises determining) an absorption or emission strength or concentration of the gas (e.g. a column integrated concentration in an atmospheric volume) based on the determined fractional linear polarisation data, typically with reference to one or more calibration references.

It may be that the fractional linear polarisation data determined by the controller (or by the method) is indicative of a fractional linear polarisation of at least 5% of the average relative depth of the spectral features of the gas within the selected frequency range.

It may be that the apparatus further comprises an objective lens for (or it may be that the method comprises an objective lens) receiving received radiation and directing it towards the filter.

It may be that the objective lens is a telecentric lens. In this case, radiation received and output by the telecentric objective lens is typically incident on the one or more retarders at an angle of incidence independent of its angle of incidence on the telecentric objective lens.

It may be that the objective lens is a non-telecentric lens. In this case, radiation received and output by the non-telecentric objective lens is typically incident on the one or more retarders at an angle of incidence which is dependent on its angle of incidence on the non-telecentric objective lens.

It may be that the apparatus comprises a plurality of groups of radiation detectors, each of the said groups comprising one or more radiation detectors to detect (or it may be that the method comprises detectors of each of a plurality of groups of radiation detectors detecting) radiation output from the one or more retarders filtered for a respective polarisation state by one or more polarisers, the one or more detectors selectively (and typically separately) detecting polarised radiation conforming to each of (e.g. the) at least first and second of the said polarised spectral modulation profiles to thereby provide at least respective first and second polarisation-dependent radiation intensity measurements from which the presence of the gas can be determined.

It may be that the apparatus comprises a plurality of groups of radiation detectors, each of the said groups comprising radiation detectors to detect radiation output from the one or more retarders filtered for respective polarisation states by one or more polarisers, the radiation detectors of each of the groups selectively and separately detecting on different detectors at the same time polarised radiation conforming to each of at least first and second of the said polarised spectral modulation profiles to thereby provide at least respective first and second polarisation-dependent radiation intensity measurements from which the presence of the gas can be determined.

It may be that the plurality of groups of radiation detectors are configured to selectively and separately detect radiation filtered for the said respective polarisation states at the same time as each other.

It may be that the radiation detectors of the said plurality of groups of radiation detectors are provided on a common focal plane.

It may be that the said plurality of groups of radiation detectors are offset from each other, for example in the common focal plane.

It may be that the apparatus is configured to spatially modulate the polarisation of the received radiation by the said plurality of groups of radiation detectors detecting polarised radiation output from the one or more retarders, the respective groups of radiation detectors being offset from each other, for example in a common focal plane.

It may be that the radiation detectors of the said plurality of groups of radiation detectors are provided in a tessellated arrangement.

It may be that the plurality of groups of radiation detectors are provided in a periodic tessellated arrangement, the periodicity of the tessellated arrangement being in respect of the linear polarisation angles of radiation which the detectors of the groups are configured to detect. This allows the polarisation of the detected radiation to be spatially modulated across the tessellated arrangement.

It may be that the said radiation detectors within each of the said groups are tessellated in a respective 2×2 or a 2×3 arrangement or a 2×4 arrangement. It may be that the 2×2, 2×3 or 2×4 arrangements are repeating patterns in respect of the linear polarisation states of the radiation to be detected by the detectors of the respective arrangements.

It may be that the radiation detectors within each of the said groups are adjacent to each other.

It may be that the radiation detectors of a group of the said plurality of groups are configured to detect radiation output from the one or more retarders filtered for the same respective linear polarisation states as respective radiation detectors of one or more or each of the other groups of the plurality of groups.

It may be that, within each of the groups of radiation detectors, the radiation detectors are each to detect radiation filtered for a different linear polarisation state from the other detectors in the respective group.

It may be that the apparatus comprises, for each of the groups of radiation detectors, a corresponding group of polarisers for filtering for the respective polarisation states the radiation output by the one or more retarders, the corresponding group of polarisers comprising one or more polarisers.

It may be that each of the said groups of radiation detectors are provided with a plurality of (typically fixed angle) linear polarisers, each to receive (or it may be that the method comprises each of the said groups of radiation detectors having a plurality of (typically fixed angle) linear polarisers each receiving) radiation having spectrally modulated polarisation from the one or more retarders and output (or outputting) linearly polarised radiation (e.g. at a respective linear polarisation angle) to a respective radiation detector of the said plurality of radiation detectors of the said group, typically to provide respective polarisation dependent intensity measurements from which presence of the gas can be determined. It may be that the plurality of linear polarisers for each group comprise linear polarisers of different linear polarisation angles.

It may be that the groups of polarisers are provided in a tessellated arrangement.

It may be that the groups of polarisers are provided in a periodic tessellated arrangement, the periodicity being in respect of the linear polarisation angles of the polarisers of the said groups. This helps to enable the spatial modulation of the polarisation of the detected radiation across the tessellated arrangement.

It may be that the groups of polarisers are provided on a common focal plane.

It may be that the groups of polarisers are offset from each other, for example in the common focal plane.

It may be that the said groups of radiation detectors are provided adjacent to each other in a (typically two dimensional) radiation detector array.

It may be that the apparatus comprises a controller to determine (or it may be that the method comprises determining), for each of the said groups, the presence of a gas (preferably the absorption or emission strength of the gas). It may be that the controller is configured to determine (or it may be that the method comprises determining), in dependence on the said determinations, an (typically two-dimensional) image selectively indicating presence of gas (preferably relative absorption or emission strengths of the gas) at a plurality of locations across the image. It may be that the controller is configured to determine gas detection measurements based on the respective at least first and second polarisation-dependent intensity measurements for each of the respective groups, for example by determining a measure of fractional linear polarisation based thereon.

It may be that the controller is configured to reduce or remove systematic errors (e.g. in the fractional linear polarisation measurement or in the polarisation dependent radiation intensity measurements from which the presence of gas may be determined) depending on a combination of polarisation modulations applied to the received radiation in different domains. It may be that the controller is configured to reduce or remove systematic errors depending on a plurality of polarisation modulations applied to the received radiation by the apparatus, the plurality of polarisation modulations comprising the one or more retarders spectrally modulating the linear polarisation state of the received radiation to provide the received radiation with a plurality of polarised spectral modulation profiles which are offset in phase from each other, each of which is associated with a different linear polarisation angle, and any one or more of: the one or more retarders spectrally modulating the linear polarisation state of the received radiation in accordance with different polarised spectral modulation profiles for different angles of incidence of the radiation on the one or more retarders (e.g. for radiation of the same linear polarisation angle); the apparatus modulating the polarisation state of radiation output by the one or more retarders differently over time; the apparatus spatially modulating the received radiation by the said plurality of groups of radiation detectors detecting radiation output from the one or more retarders, each of the groups of detectors comprising radiation detectors selectively and separately detecting on different detectors at the same time polarised radiation conforming to each of at least first and second of the said polarised spectral modulation profiles to thereby provide at least respective first and second polarisation-dependent radiation intensity measurements from which the presence of the gas can be determined, the respective groups of radiation detectors being offset from each other, for example in a common focal plane. It may be that the respective groups of radiation detectors are offset from each other in a periodic tessellated arrangement, the periodicity of the tessellated arrangement being in respect of the linear polarisation angles of radiation which the detectors of the groups are configured to detect.

Thus, it may be that the one or more retarders are to spectrally modulate the linear polarisation state of the received radiation to provide the received radiation with a plurality of polarised spectral modulation profiles which are offset in phase from each other, each of which is associated with a different linear polarisation angle, and that the apparatus is to additionally modulate the polarisation of the received radiation in one or more other domains, such as the angular, temporal and/or spatial domains. In this case, the polarised spectral modulation profiles to which the radiation detected by the detectors conform may be provided by the said spectral modulation, while the additional modulation helps to improve the accuracy with which radiation conforming to those profiles can be measured. In this case, it may be that the controller is configured to reduce or remove systematic errors depending on the said additional modulation.

As mentioned above, it may be that the groups of radiation detectors, the corresponding groups of polarisers, or each of the groups of radiation detectors and the corresponding groups of polarisers are arranged in a respective periodic tessellation arrangement, the periodicity being in respect of the linear polarisation angles of radiation which the detectors of the groups are configured to detect or the linear polarisation angles of the polarisers of the said groups. This periodicity constitutes a polarisation modulation in the spatial domain. This may be complementary to, for example, the polarisation modulation provided by the one or more retarders spectrally modulating the linear polarisation state of the received radiation to provide the received radiation with a plurality of polarised spectral modulation profiles which are offset in phase from each other, each of which is associated with a different linear polarisation angle. In this case, the polarisation modulation provided by the one or more retarders may provide the received radiation with the polarisation spectral modulation profiles which allow the presence of gas to be determined, while the additional spatial modulation helps to improve the accuracy with which radiation conforming to those profiles can be measured. This polarisation modulation in the spatial domain may provide additional information which can be used to mitigate systematic errors, for example in the fractional linear polarisation measurement or in the polarisation dependent intensity measurements from which the presence of gas may be determined.

It may be that the controller is to determine (or it may be that the method comprise determining), for each of a plurality of radiation detectors (e.g. for each radiation detector of one or more or each of the said groups), whether gas is present in dependence on polarisation-dependent radiation intensity measurements (i.e. radiation intensity measurements of polarised radiation) by that radiation detector and by one or more radiation detectors proximal to that radiation detector. The said one or more radiation detectors proximal to the said radiation detector may comprise one or more radiation detectors of a said group comprising the said radiation detector. The said one or more radiation detectors proximal to the said radiation detector may comprise one or more radiation detectors of a said group which does not comprise the said radiation detector.

It may be that the controller is configured to use a polarisation-dependent radiation intensity measurement from one of the radiation detectors in the determination of the presence of the gas for a plurality of (e.g. two or more, three or more or four or more) positions in the focal plane. It may be that the controller is configured to use a polarisation-dependent radiation intensity measurement from each of a plurality of detectors in the determination of the presence of the gas for a respective plurality of positions in the focal plane. In this way, the spatial resolution of the image may be increased (for example compared to determining whether the gas is present once per group of detectors). For example, a determination as to whether gas is present may be determined in this way for each detector (e.g. for each detector of each group). In addition, systematic errors which may otherwise appear in the fractional linear polarisation measurement or in polarisation dependent intensity measurements, for example due to aliasing and/or due to dead pixels, can be reduced or removed (for example as compared to determining whether the gas is present once per group of detectors). For example it may be that the controller is configured to determine whether gas is present in respect of a first position on a focal plane depending on polarisation-dependent radiation intensity measurements (i.e. radiation intensity measurements of polarised radiation) by at least a first one of the radiation detectors and a second one of the radiation detectors, and to determine whether gas is present in respect of a second position on the focal plane depending on polarisation-dependent radiation intensity measurements by at least the first one of the radiation detectors and a third one of the radiation detectors different from the second one of the radiation detectors. It may be that the controller is configured to determine whether gas is present in respect of a first position on a focal plane depending on polarisation-dependent radiation intensity measurements (i.e. radiation intensity measurements of polarised radiation) by at least a first one of the radiation detectors, a second one of the radiation detectors and a third one of the radiation detectors, and to determine whether gas is present in respect of a second position on the focal plane depending on polarisation-dependent radiation intensity measurements by at least the first one of the radiation detectors, the second one of the radiation detectors and a fourth one of the radiation detectors different from the third one.

Thus, by spatially modulating the polarisation of the received radiation by the plurality of groups of radiation detectors detecting radiation output from the one or more retarders, the respective groups of radiation detectors being offset from each other in a periodic tessellated arrangement, the periodicity of the tessellated arrangement being in respect of the linear polarisation angles of radiation which the detectors of the groups are configured to detect, information from respective proximal (e.g. surrounding) pixels can be used to determine the fractional linear polarisation, and thus the presence of the gas, in respect of the location of each of the detectors (e.g. in respect of the location of each pixel in the array). It may be typically assumed that the gas concentration varies smoothly, and thus that the fractional linear polarisation varies smoothly (e.g. at a frequency greater than the individual pixel level, or at a frequency greater than the spatial modulation frequency) across the radiation detectors of the plurality of groups (e.g. over the focal plane of the detector array). As such, a systematic issue with an individual pixel can be mitigated by the spatial modulation. In the Fourier domain, this can be thought of as considering information at a predefined spatial modulation carrier frequency (i.e. the frequency with which the polarisation is spatially modulated across the detectors) and removing or discarding information at frequencies which differ (or which differ significantly) from the predetermined spatial modulation frequency (which may be information from individual pixels producing systematic errors).

It may be that the polarisation-dependent radiation intensity measurements detected by the first and second, or first, second and third, or first, second and fourth ones of the radiation detectors, are determined by detecting polarised radiation conforming to different ones of the polarised spectral modulation profiles.

It may be that the apparatus (e.g. the controller) is configured to output the said two-dimensional image to a user interface such as a display.

It may be that the said plurality of groups of radiation detectors comprises a first group arranged to receive (or receiving) radiation incident on the objective lens at a first angle of incidence and a second group arranged to receive (or receiving) radiation incident on the objective lens at a second angle of incidence different from the first angle of incidence. It may be that the first and second angles of incidence are offset from each other by at least 45°.

It may be that each of one or more of the said groups, or each of the said groups, comprise a first detector to detect (or detecting) radiation filtered for a first linear polarisation angle and conforming to the said first polarised spectral modulation profile and a second detector to detect (or detecting) radiation filtered for a second linear polarisation angle and conforming to the said second polarised spectral modulation profile. It may be that each of one or more of the said groups, or each of the said groups, comprise a third detector to detect (or detecting) radiation filtered for a third linear polarisation angle and conforming to a third said polarised spectral modulation profile. It may be that each of one or more of the said groups, or each of the said groups, comprise a fourth detector to detect (or detecting) radiation filtered for a fourth linear polarisation angle and conforming to a fourth said polarised spectral modulation profile.

It may be that the apparatus comprises a controller to derive (or it may be that the method comprises deriving) a concentration of the gas in the atmosphere from the polarisation-dependent intensity measurements by the first and second groups of radiation detectors.

It may be that the received radiation comprises or consists of radiation emitted by the sun (and typically scattered by the Earth's atmosphere).

It may be that the received radiation received by the one or more retarders has passed through a gas measurement volume within which the gas is to be detected.

A third aspect of the disclosure provides a method of determining presence of a gas, the method comprising: obtaining (e.g. retrieving from a memory or receiving from one or more radiation detectors) at least first and second polarisation dependent radiation intensity measurements; and determining presence of a gas based on the at least first and second polarisation dependent intensity measurements. It may be that determining presence of the gas based on the at least first and second polarisation dependent radiation intensity measurements comprises determining fractional linear polarisation data based on the at least first and second polarisation dependent intensity measurements. It may be that determining presence of the gas based on the at least first and second polarisation dependent radiation intensity measurements comprises comparing the first and second polarisation dependent radiation intensity measurements.

It may be that the method comprises obtaining (e.g. retrieving from a memory or receiving from one or more radiation detectors) at least first, second and third polarisation dependent radiation intensity measurements; and determining presence of a gas based on the at least first, second and third polarisation dependent intensity measurements. It may be that the method comprises determining presence of the gas based on the at least first, second and third polarisation dependent intensity measurements by determining fractional polarisation data based on the at least first, second and third polarisation dependent intensity measurements.

It may be that the fractional linear polarisation data is indicative of a fractional linear polarisation of a beam of radiation from which the at least first and second (and, where provided, third, and, where provided, fourth etc.) polarisation dependent intensity measurements are made. It may be that the fractional linear polarisation data comprises a measure of the fractional linear polarisation of the said beam of radiation, for example with respect to a zero target gas concentration reference which may be selected depending on a measured temperature. It may be that the method comprises obtaining a measured temperature, selecting a zero target gas concentration reference dependent on the measured temperature, and determining the fractional linear polarisation data in dependence on the selected zero target gas concentration reference.

It may be that the method comprises determining an absorption or emission strength or a concentration of the gas by comparing the said fractional linear polarisation data to a calibration curve. It may be that the calibration curve relates a measure of fractional linear polarisation to a concentration of the gas. It may be that the gas is a target gas.

A fourth aspect of the disclosure provides data processing apparatus comprising processing circuitry to perform the method according to the third aspect of the disclosure.

A fifth aspect of the disclosure provides machine readable instructions executable by a hardware computer processor to perform the method of the third aspect of the disclosure.

A sixth aspect of the disclosure provides a non-transitory computer readable medium comprising machine readable instructions executable by a hardware computer processor to perform the method of the third aspect of the disclosure.

It will be understood that optional and preferred features of each aspect of the present disclosure are also optional or preferred features of each other aspect of the present disclosure where appropriate. For example, it may be that apparatus features correspond to method features.

BRIEF DESCRIPTION OF THE DRAWINGS

Embodiments of the disclosure are further described hereinafter with reference to the accompanying drawings, in which.

DETAILED DESCRIPTION

An apparatus and method for determining the presence of a gas are provided. The apparatus and method may be for determining the presence of a target gas within a volume of unknown gas composition. The apparatus and method may further be for determining the radiation absorption or emission strength of a gas, for example a radiation absorption or emission strength relative to a calibration reference or threshold. The apparatus and method may be for determining a concentration of the gas. The gas may be any gas with a known absorption or emission spectrum. The gas may be an atmospheric trace gas. Example gases that may be determined to be present may include $NO_2$, $O_3$, CO, $CO_2$ and $CH_4$, however the apparatus is not limited to detect only these gases and these are mentioned for example only. The apparatus to determine the presence of gas may be used for example in the remote sensing of atmospheric trace gases for air pollution monitoring and source detection. The apparatus may be used in ground-based air pollution monitoring or targeted pollution measurements from a mobile platform, for example in a law-enforcement campaign and using measurements from drones. The apparatus may also, or alternatively, be used in gas leak detection, for example in the oil and gas industry using a hand-held system, drones or satellites. The apparatus may also or alternatively be used in earth observation from space, for example $NO_2$ measurements may be performed using cubesats, or $CO_2$ localisation may be measured.

An apparatus and method are provided for determining the presence of a gas which may be compact and robust, making it suitable for use in environments as described above. Although the following description assumes that the presence of the gas is determined by way of absorption of radiation by the gas, it will be understood that the techniques and apparatus described herein are applicable to determining presence of the gas by emission of radiation by the gas.

Figure 1A:
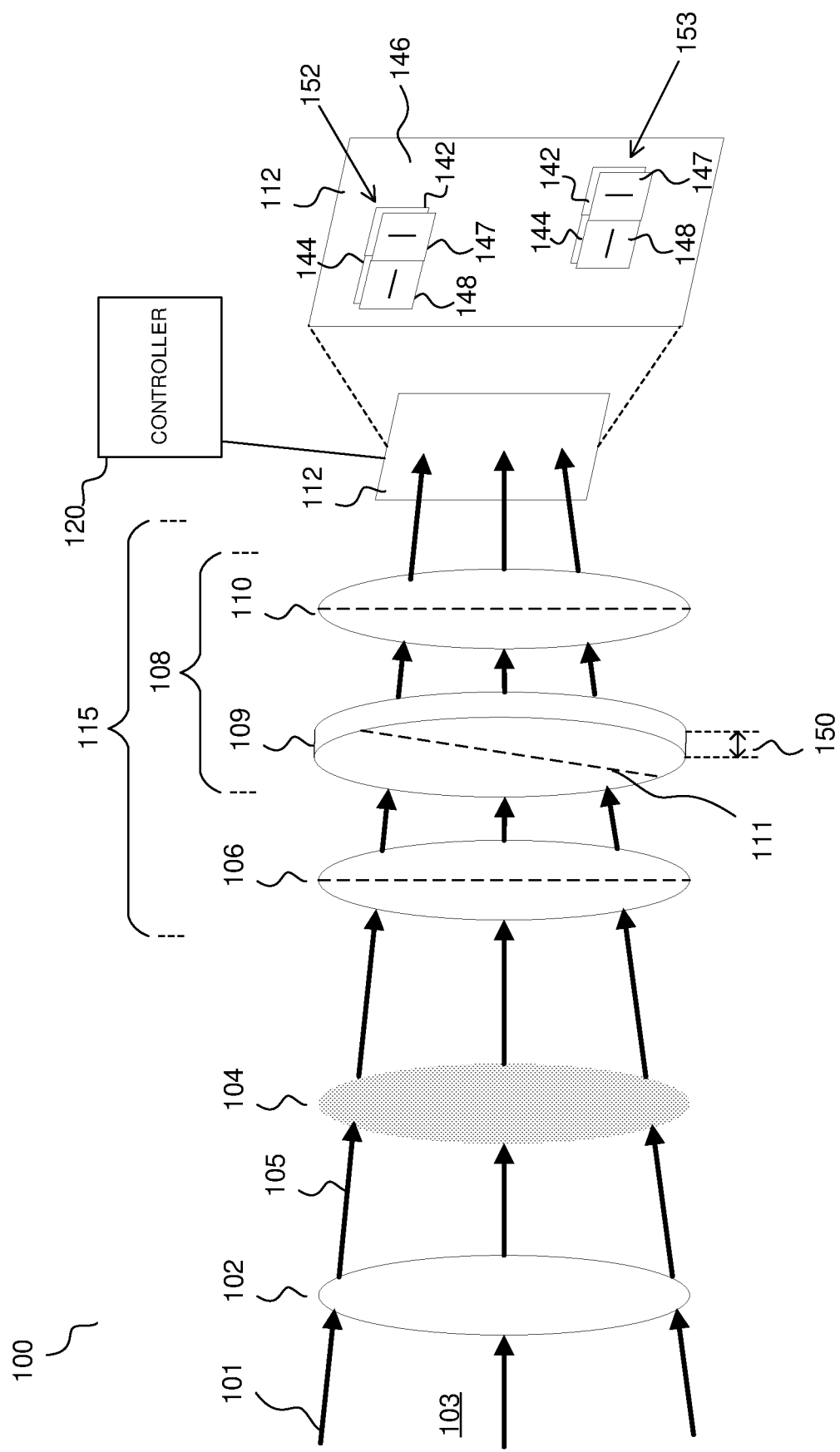
FIG. 1a schematically illustrates an apparatus to detect polarised radiation from which the presence of a gas can be determined, wherein the apparatus includes a telecentric lens.

A first embodiment will be described which relates to FIGS. 1a, 1b and 2. FIG. 1a schematically illustrates apparatus 100 for detecting presence of a gas. The apparatus 100 may comprise a telecentric objective lens 102 for capturing and converging incoming electromagnetic radiation 101 (which may be from a broadband radiation source) which has passed through a gas detection volume 103 which may comprise the gas to be detected (e.g. such that selected frequencies of the radiation may have been attenuated due to absorption by the gas in accordance with its gas absorption spectrum). As the lens 102 is telecentric, the optical axis direction of the converging beam is independent of position inside the field of view of the lens 102. The received radiation 101 may comprise sunlight (which is typically scattered by the atmosphere) and the gas detection volume 103 may comprise a column volume of the earth's atmosphere through which the sunlight propagates. The gas to be detected may be a trace gas in the earth's atmosphere. Alternatively, the received radiation may comprise radiation from a local electromagnetic radiation source (e.g. an incandescent light source or light emitting diode (LED)) and the gas detection volume may comprise or consist of a local (e.g. closed) gas detection volume. In the former case, the received radiation is typically provided with a polarisation pattern as a result of scattering by air, water and aerosol molecules in the atmosphere. In the latter case, the radiation may be unpolarised or it may be linearly polarised, for example at a linear polarisation angle of 0°. The received radiation typically comprises electromagnetic radiation of a plurality of electromagnetic frequencies across a frequency range. Typically the frequencies of received radiation extend over a continuous range of frequencies. Typically the radiation may comprise any one or more of ultraviolet, visible, near-infrared, mid-infrared electromagnetic radiation.

Converging radiation 105 output by the telecentric objective lens 102 may be directed towards an optical filter 104. The optical filter 104 may be a bandpass interference filter for selectively transmitting electromagnetic radiation within a selected frequency range defined by a passband. The passband may be selected to allow electromagnetic radiation of frequencies corresponding to a portion of the absorption spectrum of the gas to be detected. The portion of the absorption spectrum may comprise periodic or quasi-periodic absorption lines, that is, corresponding to a portion of the absorption spectrum of the gas to be detected comprising a plurality of absorption lines having respective absorption peaks which are offset from each other in frequency, the frequency spacing between successive ones of the said peaks being substantially equal.

Figure 2:
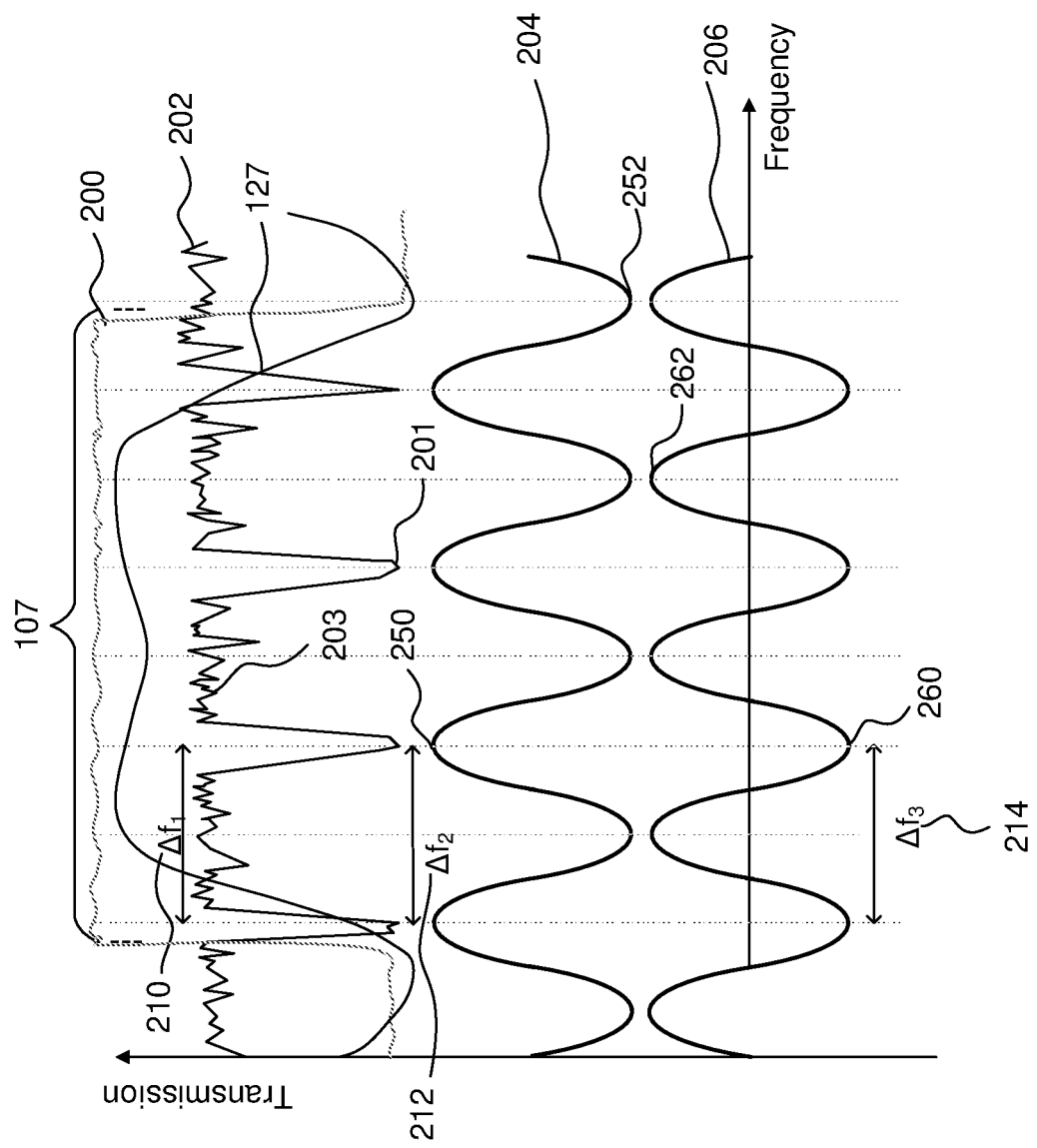
FIG. 2 schematically illustrates how the absorption spectrum of a gas compares to intensity signals corresponding to the polarised spectral modulation profiles for linear polarisation angles of 0° and 9°.

FIG. 2 illustrates a portion 107 of an exemplary absorption spectrum which comprises four substantially periodic absorption peaks 201, adjacent ones of which are offset from each other in frequency by a substantially constant frequency spacing $\Delta f_1$ 210. The portion 107 of the absorption spectrum is selected by the optical filter 104 having a passband 200 which transmits radiation having frequencies corresponding to the portion 107 of the absorption spectrum.

Referring back to FIG. 1a, the radiation transmitted by the filter 104 may be output to a spectral modulator 115. In the exemplary embodiment, the spectral modulator 115 comprises a linear polariser 106 and one or more retarders 108, the one or more retarders 108 in the example of FIG. 1 comprising a retarder plate 109 and a quarter waveplate 110. It will be understood that if the received radiation 101 is linearly polarised, for example at a known angle of linear polarisation, the linear polariser 106 may not be required. In some embodiments, the quarter waveplate 110 may be omitted; this will be explained in more detail below. The linear polariser 106, where provided, may linearly polarise radiation transmitted by the filter 104, for example at a linear polarisation angle of 0°.

The one or more retarders 108 receive linearly polarised, converging radiation at a linear polarisation angle of 0° from the polariser 106 (or from the filter 104 if the polariser 106 is omitted). The spread of angles due to the converging beam is identical for all points in the field of view of the lens 102. Accordingly the angle of incidence of the radiation on the one or more retarders is independent of its angle of incidence on the telecentric objective lens 102. The one or more retarders 108 may comprise one or more non-birefringent retarders such as a Fresnel Rhomb, but more typically the retarders 108 may comprise or consist of one or more birefringent elements. In the following description it will be assumed that the one or more retarders 108 comprise one or more birefringent elements.

The birefringent elements (typically birefringent crystals) of the one or more retarders 109 each have slow and fast axes having different refractive indices for polarised components of received radiation parallel and perpendicular to the optic axis. The optic axis may be oriented at 45° relative to the linear polarisation angle (0°) of the radiation it receives from the polariser 106 or filter 104. When the radiation enters the one or more birefringent elements, a first portion of the radiation propagates along the fast axis and a second portion propagates along the slow axis before the two portions recombine at the output side of the birefringent elements. The difference in the refractive indices of the slow and fast axes causes an optical path length difference between the optical paths travelled by the first and second portions of the radiation. This retardance modulates the polarisation state of the radiation. The way in which the polarisation state of the radiation is modulated depends on the frequency of the radiation. Because the radiation comprises a range of different frequencies, the radiation output by the one or more birefringent elements therefore has a number of components of different polarisation.

The polarisation state of the recombined radiation output by the birefringent elements, and thus the amplitudes of respective components of the polarisation state at particular linear polarisation angles, depend on the phase difference between the component of the radiation propagating on the fast axis and the component of the radiation propagating on the slow axis. This phase difference is frequency dependent. Accordingly, for some frequencies, a component of the recombined radiation at a particular linear polarisation angle has a maximum amplitude, while for other frequencies the component of the recombined radiation at that linear polarisation angle has a minimum amplitude, and for other frequencies the component of the recombined radiation at that linear polarisation angle will have an amplitude between the minimum and maximum amplitudes. In this way, as a function of frequency, the amplitude of the component of the radiation at that linear polarisation angle may be spectrally modulated (typically substantially sinusoidally) in accordance with a polarised spectral modulation profile comprising a plurality of substantially periodic maxima and minima. Indeed, the polarisation state of the radiation may be spectrally modulated in accordance with different polarised spectral modulation profiles for different angles of linear polarisation. The spectral modulation profiles may be offset from each other in phase corresponding to the relative difference in the linear polarisation angle at which they are filtered (the phase difference being twice the difference in linear polarisation angle because all linear polarisation phenomena have a 180° ambiguity and thus periodicity).

Typically the thickness of the one or more birefringent elements is selected to provide a retardance which converts the polarisation state of the received radiation at different frequencies to a polarisation state having components of linear polarisation (and thus polarised spectral modulation profiles) at linear polarisation angles of 0° and 90° and components which are right and left hand circularly polarised, but with no components of linear polarisation at +/−45°. The quarter waveplate 110 (where provided), which may have an optic axis arranged parallel to the linear polarisation state of the radiation received by the one or more birefringent elements, converts the polarisation state of the radiation from the retarder 109 into radiation which has components of linear polarisation (and thus polarised spectral modulation profiles) at linear polarisation angles of 0°, 45°, 90° and 135°, thereby providing radiation having a full state of linear polarisation.

In a first example, the quarter waveplate 110 is omitted and radiation output by the retarder plate 109 having spectrally modulated polarisation is detected by first and second detectors 142, 144 of detection apparatus 112, the detectors being provided in this example on a common focal plane 146. A first linear polariser 147 which linearly polarises radiation at a linear polarisation angle of 0° (although this 0° angle is arbitrary, it may act as a 0° reference point for the rest of the optics of the apparatus) is provided over the first detector 142 and a second linear polariser 148 which linearly polarises radiation at a linear polarisation angle of 90° is provided over the second detector 144. It may be that the first and second linear polarisers 147, 148 each receives from the one or more retarders radiation having a plurality of linear polarisation components and provides at a single output radiation having a single predefined linear polarisation, in this case for example 0° and 90° for the first and second polarisers 147, 148 respectively. The first detector 142 may detect the polarised radiation output from the first linear polariser 147 (indiscriminately with frequency over the selected frequency range) to provide a first polarisation dependent intensity measurement $I_0$. The second detector 144 may detect the polarised radiation output from the second linear polariser 148 (indiscriminately with frequency over the selected frequency range) to provide a second polarisation dependent intensity measurement $I_{90}$.

The radiation output from the one or more retarders 108 comprises radiation having polarisation spectrally modulated in accordance with the said plurality of polarised spectral modulation profiles in a common beam of radiation. The radiation filtered by polariser 147 for linearly polarised radiation at 0° is filtered from a beam of radiation comprising radiation spectrally modulated in accordance with both the first and second said polarised spectral modulation profiles (and the radiation filtered by polariser 147 for linearly polarised radiation at 90° is filtered from a beam of radiation comprising radiation having polarisation spectrally modulated in accordance with the first and second said polarised spectral modulation profiles). By providing radiation having polarisation spectrally modulated in accordance with the polarised spectral modulation profiles in a common beam of radiation, the radiation modulated in accordance with each of the polarised spectral modulation profiles follows substantially the same optical path from the one or more retarders 108 to the detectors 142, 144. Thus, by splitting the beam in the polarisation domain by way of the retarders, rather than splitting the beam into two portions which each follow a separate physical optical path (as would be the case in a classical interferometer such as a Michelson interferometer which splits the beam into two independent arms before recombining them or a Mach-Zender interferometer which also utilises more than one optical path), the different polarisation states of the beam follow a common optical path. As such, the apparatus is only sensitive to relative temperature effects on the different polarisation states and not on temperature dependent path length variations (as would be the case in a classical interferometer). This helps to keep the apparatus compact and makes the apparatus more tolerant to temperature changes. The relative temperature effects on the different polarisation states can be accounted for in different ways, as will be described in more detail below. Due to the common optical path followed by the different polarisation states of the beam, the apparatus is also more tolerant to vibration.

When the radiation having the spectrally modulated polarisation is filtered at a polarisation angle corresponding to a respective said polarised spectral modulation profile, the intensity of the detected radiation varies with frequency of radiation in accordance with that profile. This is illustrated in FIG. 2 which shows first and second signals 204, 206. Although signals 204, 206 are shown offset from each other in amplitude in FIG. 2, it will be understood that this is only for illustration purposes and that both signals in fact vary between normalised amplitudes of 0 and 1. The first signal 204 is the variation of intensity with frequency of radiation output by the spectral modulator 115 and filtered for a linear polarisation angle of 0° by the first linear polariser 147 provided over the first detector 142.

The second signal 206 is the variation of intensity with frequency of radiation output by the spectral modulator 115 and filtered for a linear polarisation angle of 90° by the second linear polariser 148 provided over the second detector 144. As there is a 90° difference between the linear polarisation angles of the first and second polarisers 147, 148, the first and second signals 204, 206 are offset from each other in phase by 180°.

By the polarised spectral modulation profiles being provided in a common beam of radiation, and the radiation detectors 142, 144 selectively, separately and simultaneously detecting polarised radiation conforming to the respective polarised spectral modulation profiles, the apparatus can be made with few (if any) moving parts, enabling a robust construction. In addition, more sensitive and accurate gas detection can be achieved at least because the respective polarisation dependent radiation intensity measurements are made under identical temperature, vibration, optical alignment and gas concentration conditions. The thicknesses of the one or more retarders 108 may be selected such that the (substantial) periodicity of the transmission maxima and minima of the polarised spectral modulation profiles substantially matches the period or quasi-period of the absorption peaks of the said portion 107 of the absorption spectrum of the gas. In addition, the retarders 108 and polariser 106 (where provided) may be rotated until the maxima 250 of the first polarised spectral modulation profile (and thus of the first signal 204) are aligned (and substantially overlap) in frequency with the absorption lines, and preferably the absorption peaks 201, of the portion 107 of the absorption spectrum of the gas in the selected frequency range, and the transmission minima 252 of the first polarised spectral modulation profile (and thus of the first signal 204) are aligned (and substantially overlap) in frequency with portions 203 of the absorption spectrum of the gas between the absorption peaks 201 (preferably off the absorption lines). By virtue of the 180° phase difference between the first and second spectral modulation profiles, the transmission minima 260 of the second polarised spectral modulation profile (and thus of the second signal 206) are thus aligned (and overlap) in frequency with the absorption peaks 201 of the portion 107 of the absorption spectrum of the gas, and the transmission maxima 262 of the second polarised spectral modulation profile (and thus of the second signal 206) are aligned (and overlap) in frequency with portions 203 of the absorption spectrum of the gas between the absorption peaks 201 in the selected frequency range. In FIG. 2, any effect of absorption of radiation by the gas is omitted from the first and second signals 204, 206 for illustration purposes. However, it will be understood that when the gas is present a portion of the resulting spectrum has a lower intensity at the spectral modulation maxima due to absorption of radiation by the gas.

However, because the transmission maxima 262 of the second signal 206 are out of phase with the absorption peaks 201 of the gas, the second polarisation dependent intensity measurement $I_{90}$ will be relatively unaffected by the presence of the gas. Accordingly, by comparing the first and second polarisation dependent intensity measurements, the presence of the gas can be determined. This may be done by a controller 120 which receives radiation detection data from the first and second detectors 142, 144 relating to the first and second polarisation dependent intensity measurements, $I_0$, $I_{90}$. The controller 120 may comprise data acquisition circuitry for receiving the radiation detection data and processing circuitry for processing the received radiation detection data (e.g. by executing stored computer program instructions causing it to process the received radiation detection data) to thereby compare the first and second polarisation dependent intensity measurements $I_0$, $I_{90}$ to thereby detect presence of the gas.

The controller 120 may determine the presence of the gas (and in some cases the concentration of the gas) by determining fractional linear polarisation data relating to the fractional linear polarisation of the radiation output from the one or more retarders 108 based on the polarisation dependent intensity measurements. More specifically in this case, the controller 120 may determine the presence of the gas from the first and second intensity measurements $I_0$, $I_{90}$ by determining fractional linear polarisation data relating to the fractional linear polarisation of the light output from the one or more retarders 108 from the first and second polarisation dependent intensity measurements obtained by the first and second detectors 142, 144 $I_0$, $I_{90}$. This will be explained as follows.

A Stokes vector $[I_{meas}, Q_{meas}, U_{meas}, V_{meas}]^T$ may be used to describe the linear polarisation state of the radiation after it has been spectrally modulated by the spectral modulator 115, and this may be defined as below:

$$\begin{bmatrix} I_{meas} \\ Q_{meas} \\ U_{meas} \\ V_{meas} \end{bmatrix} = \begin{bmatrix} \text{regular intensity} \\ \text{linear polarisation } 0°/90° \\ \text{linear polarisation } 45°/135° \\ \text{circular polarisation} \end{bmatrix} = \qquad \text{(Equation 1)}$$

$$\begin{bmatrix} I_0 + I_{90} = I_{45} + I_{135} = I_{RHC} + I_{LHC} = \frac{1}{2}(I_0 + I_{90} + I_{45} + I_{135}) = \ldots \\ I_0 - I_{90} \\ I_{45} - I_{135} \\ I_{RHC} - I_{LHC} \end{bmatrix}$$

where: $I_{45}$ would be a third polarisation dependent intensity measurement by a radiation detector having a linear polariser provided in front of it, the linear polariser transmitting radiation of linear polarisation angle of 45°;

$I_{135}$ would be a fourth polarisation dependent intensity measurement by a radiation detector having a linear polariser provided in front of it, the linear polariser transmitting radiation of linear polarisation angle of 135°;

$I_{RHC}$ would be a fifth polarisation dependent intensity measurement by a radiation detector having a polariser provided in front of it, the polariser transmitting radiation of right hand circular polarisation; and $I_{LHC}$ would be a sixth polarisation dependent intensity measurement by a radiation detector having a polariser provided in front of it, the polariser transmitting radiation of left hand circular polarisation.

In this example it is assumed that the U component of the Stokes vector is zero because the retarder plate 109 is designed not to output radiation polarised at 45° or 135°. Accordingly, radiation is only measured, at the detection apparatus 112, at linear polarisation angles of 0° and 90°. This is indicated by $U_{meas}$ and $V_{meas}$ being set equal to zero in equation 2 below, but it will be understood that $U_{meas}$ and $V_{meas}$ are not typically physically measured in this embodiment.

$$\begin{bmatrix} I_{meas} \\ Q_{meas} \\ U_{meas} \\ V_{meas} \end{bmatrix} = \begin{bmatrix} I_0 + I_{90} \\ I_0 - I_{90} \\ 0 \\ 0 \end{bmatrix} \qquad \text{(Equation 2)}$$

Using Equation 2, the controller 120 may determine the values of $I_{meas}$ and $Q_{meas}$ based on the first intensity value, $I_0$, and the second intensity value, $I_{90}$. Assuming that the U and V components of the Stokes vector are zero, the fractional linear polarisation can be determined from:

$$\text{Fractional linear polarisation} = \frac{Q_{meas}}{I_{meas}}$$

and the Angle of Linear Polarisation, AoLP, can be assumed to be 0. In this case, it may be that the fractional linear polarisation data comprises a measure of the fractional linear polarisation of the radiation output by the spectral modulator 115.

Figure 3:
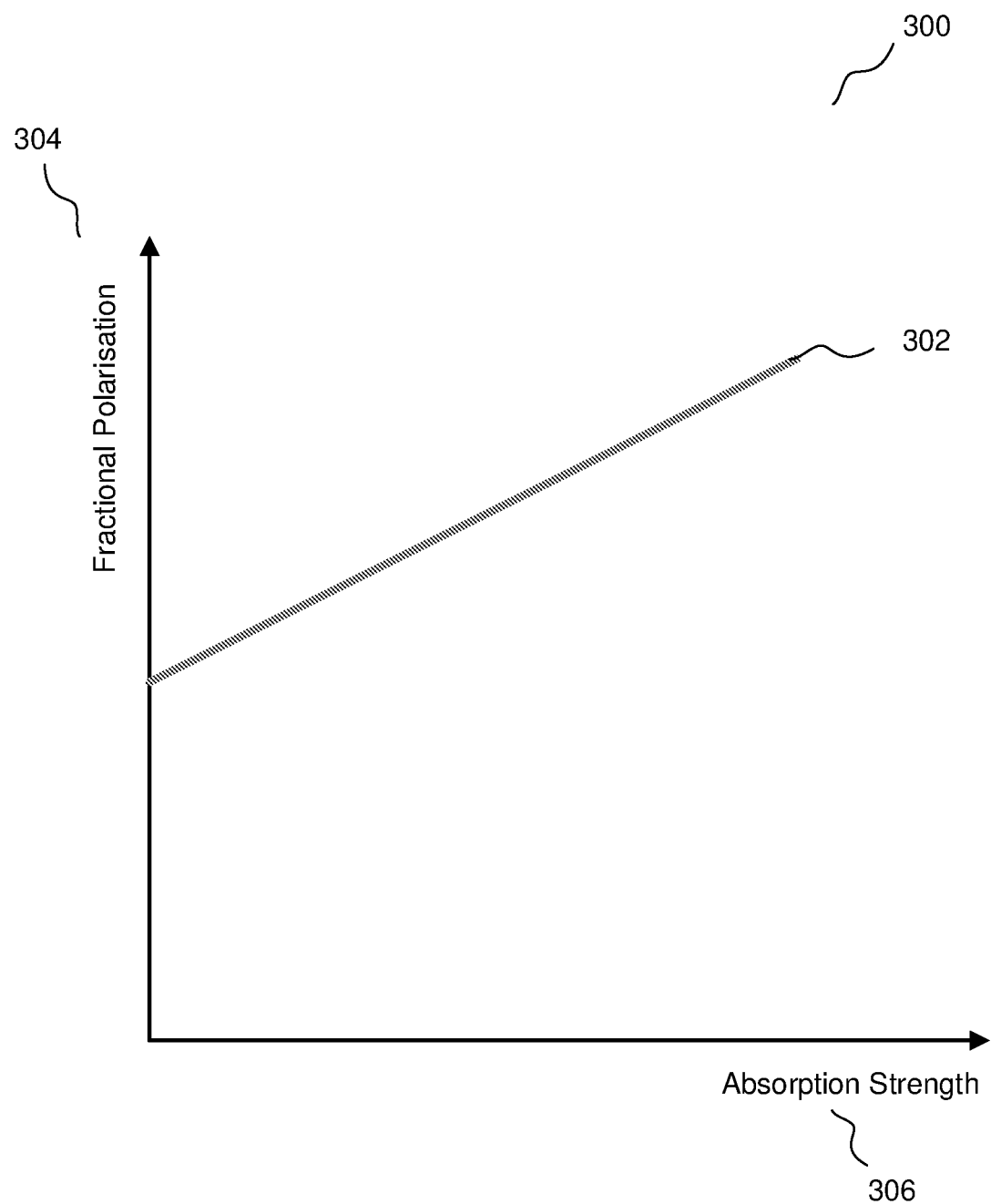
FIG. 3 schematically illustrates an example calibration curve to determine the absorption strength of the gas from the fractional linear polarisation of detected polarised radiation.

The fractional linear polarisation of the emergent radiation from the spectral modulator 115 is directly proportional to the absorption strength of the gas. A calibration reference may be used to convert the fractional linear polarisation into absorption strength. An example calibration graph to determine absorption strength is illustrated in FIG. 3. The absorption strength of the gas may be found by determining the fractional linear polarisation of the radiation detected at the detection apparatus 112 and matching it to the absorption strength of the gas that lies on the calibration curve at that value of fractional linear polarisation.

The steeper the calibration curve 302 of FIG. 3, the more sensitive the determined fractional linear polarisation 304 is to absorption strength 306. This is determined at least partially by how close the frequency spacing 210 between the absorption peaks 201 of the portion of the absorption spectrum of the gas 107 matches the frequency spacing 212 between maxima 250 of the first signal 204. In the present embodiment, the sensitivity also depends on the alignment (or overlap) between the maxima of the first signal 204 and the absorption peaks of the gas, and on the alignment (or overlap) between the maxima of the second signal 206 and portions of the absorption spectrum off the said peaks, in the selected frequency range. During assembly of the apparatus, the angles and thicknesses of the birefringent elements in the spectral modulator 115 may be adjusted until this line 302 is as steep as possible.

A calibration graph 300, as illustrated in FIG. 3, may be determined by using an enclosed control gas measurement volume. A known concentration of the gas having a known absorption strength 306 may be provided in an enclosed volume and radiation may be transmitted through the gas from a known radiation source, such as an incandescent bulb. The radiation may travel through a known path length of the enclosed volume and be detected using the apparatus 100. The fractional linear polarisation 304 may be determined from first and second polarisation dependent intensity measurements as described above, by the controller 120 using Equation 2. This may be repeated for multiple known concentrations (and thus absorption strengths 306) of the gas. A calibration graph 300 may be formed relating the fractional linear polarisation 304 to the known absorption strengths 306 of the gas. A concentration of the gas may be determined from the determined absorption strength of the gas. Additionally, or alternatively, the concentration of the gas may be determined from the fractional linear polarisation using a calibration graph of the concentration of the gas against the fractional linear polarisation, which may be determined in substantially the same way.

While in theory it may be expected that the sensitivity of the apparatus would be improved if a single absorption feature of the absorption spectrum of the gas (rather than a plurality of absorption features as shown) was to be interrogated, in practice the achievable signal to noise ratio has been found to be greater when multiple absorption features are interrogated with the same measurement.

The alignment (or overlap) in frequency of the transmission maxima and minima of the first and second signals 204, 206 with the absorption peaks 201 and the portions of the absorption spectrum of the gas between absorption peaks (as the case may be) within the selected frequency range may be affected by the temperature of the one or more birefringent elements. This may be due to the temperature dependence of the birefringence of the birefringent elements and due to the thermal expansion of the birefringent material which changes the path length through the material. This temperature dependence can adversely affect the determination of the presence of the gas, and cause errors in the gas concentration measurements.

This temperature sensitivity can be inhibited by the one or more birefringent elements comprising a plurality of birefringent elements of different types which are provided in a subtractive combination which cancels out temperature dependency of the birefringent elements. For example, it may be that the plurality of birefringent elements comprises first and second birefringent elements which have different birefringences. It may be that the fast axis of the first said birefringent element is aligned with the slow axis of the second birefringent element. It may be that the change with temperature of the retardance of the first said birefringent element is substantially equal to the change with temperature of the retardance of the second said birefringent element such that they cancel out. As the first and second elements have different birefringences, the retardances of the two elements do not cancel out. This helps to maintain alignment (or overlap) in frequency of the transmission maxima and minima of the first and second signals 204, 206 with the absorption peaks 201 and the portions of the absorption spectrum of the gas between absorption peaks (as the case may be) within the selected frequency range, thereby helping to maintain the accuracy of the apparatus in determining presence and absorption strength of the gas without having to maintain the apparatus at a constant temperature. This is discussed further below with reference to FIG. 6a.

Although the phase difference between the first and second signals 204, 206 (and thus the phase difference between the first and second polarised spectral modulation profiles) is described above as being 180°, it will be understood that this precise phase difference (although preferable) is not essential. Different phase differences will in most cases permit the gas to be detected, albeit at a reduced sensitivity. The closer the phase difference is to 180°, the more sensitive the gas detection. Preferably, the phase difference is sufficiently close to 180° that the fractional linear polarisation is at least 5% of the average (e.g. mean) relative absorption depth of the absorption lines of the gas within the selected frequency range.

The temperature sensitivity of the birefringent elements may in some cases alternatively be compensated for by performing calibrations at a range of temperatures, measuring the temperature when intensity measurements are made, and applying the appropriate temperature dependent calibration. However, in this case, typically at least three polarisation dependent intensity measurements are required. This is explained in more detail below, particularly with reference to FIGS. 6c, 6d.

In a second example, the quarter waveplate 110 is provided such that the radiation output from the spectral modulator has polarised components at linear polarisation angles of 0°, 45°, 90°, 135° (i.e. a full state of linear polarisation). In this case, it can no longer be assumed that the U component of the Stokes vector is zero, and the fractional linear polarisation may be determined by: determining values for $Q_{meas}$, $U_{meas}$ and $I_{meas}$; determining $Q_{meas}/I_{meas}$ and $U_{meas}/I_{meas}$ from the determined values of $Q_{meas}$, $U_{meas}$ and $I_{meas}$; and rotating the $[Q_{meas}, U_{meas}]$ co-ordinate system to provide a rotated co-ordinate system $[Q_{meas}', U_{meas}']$ whereby $Q_{meas}'/I_{meas} > 0$ and $U_{meas}'/I_{meas} = 0$. In this case, $Q_{meas}'/I_{meas}$ is indicative of the fractional linear polarisation of the radiation output by the spectral modulator 115. The Angle of Linear Polarisation (AoLP) may be determined from the measured Stokes Parameters of the measured Stokes Vector using Equation 3:

$$AoLP = \frac{1}{2} \operatorname{atan}\left(\frac{U_{meas}}{Q_{meas}}\right) \qquad \text{(Equation 3)}$$

Thus, in such embodiments, the controller 120 may determine the fractional linear polarisation (and optionally the AoLP) using determined values of $I_{mew}$, $U_{meas}$ and $Q_{meas}$. In order to determine the Stokes parameters, rather than two polarisation dependent intensity measurements being made which correspond to radiation output from the spectral modulator 115 filtered for linear polarisation angles of 0° and 90°, at least three polarisation dependent intensity measurements are made (in view of there being three unknowns, Q, U and I). In this example, three polarisation dependent intensity measurements are made, typically by respective radiation detectors, typically simultaneously, which correspond to radiation output from the spectral modulator 115 filtered for linear polarisation angles of 0°, 60° and 120° by respective linear polarisers which respectively filter the radiation output by the spectral modulator at linear polarisation angles of 0°, 60° and 120°. The intensity of radiation filtered for linear polarisation angles of 0°, 60° and 120° varies in accordance with first, second and third polarised spectral modulation profiles of the radiation output by the spectral modulator which are offset from each other in phase by 120° (thereby providing relative phases of 0°, 120° and 240°).

The first, second and third intensity signal measurements can be described using Stokes parameters. As there may be no circular polarisation it is assumed that the V component of the Stokes vector is zero and the Stokes vector $[I_{meas}, Q_{meas}, U_{meas}]^T$ may be used to describe the complete polarisation of the radiation output from the spectral modulator 115 as described below in Equations 4 and 5:

$$\begin{bmatrix} I_0 \\ I_{60} \\ I_{120} \end{bmatrix} = \frac{1}{2} \begin{bmatrix} I+Q \\ I - \frac{1}{2}Q + \frac{1}{2}\sqrt{3}\,U \\ I - \frac{1}{2}Q - \frac{1}{2}\sqrt{3}\,U \end{bmatrix} \qquad \text{(Equation 4)}$$

$$\begin{bmatrix} I_{meas} \\ Q_{meas} \\ U_{meas} \end{bmatrix} = \frac{2}{3} \begin{bmatrix} I_0 + I_{60} + I_{120} \\ 2\left(I_0 - \frac{1}{2}I_{60} - \frac{1}{2}I_{120}\right) \\ \sqrt{3}\,(I_{60} - I_{120}) \end{bmatrix} \qquad \text{(Equation 5)}$$

$I_0$, $I_{60}$ and $I_{120}$ may be the first, second and third polarisation-dependent intensity signal measurements filtered at linear polarisation angles of 0°, 60° and 120° respectively by respective linear polarisers.

From Equation 5, $I_{meas}$, $Q_{meas}$, $U_{meas}$ may be determined and the fractional linear polarisation (and optionally the angle) of linear polarisation may be calculated as described above. The fractional linear polarisation may then be converted into an absorption strength or concentration of the gas by using a pre-determined calibration curve as previously described. Thus, again in this case, the fractional linear polarisation data may comprise a measure of the fractional linear polarisation of the radiation output by the spectral modulator 115.

Because the quarter wave plate 110 provides the radiation output by the spectral modulator 115 with a full state of linear polarisation, the modulation phase depends linearly on the angle of the filtering linear polarisers. In addition, as described above, the three polarisation-dependent intensity measurements allow the full fractional linear polarisation of the radiation output by the spectral modulator 115 to be determined. Accordingly, it is not necessary in this example for the maxima of any of the first, second and third polarised spectral modulation profiles to be aligned (or overlap) with the absorption lines of the gas in the selected frequency range or for the maxima of any of the first, second and third polarised spectral modulation profiles to be aligned (or overlap) off the absorption lines of the gas in the selected frequency range. This helps to make the apparatus 100 even less sensitive to changes in temperature as spectral shifts in the polarised spectral modulation profiles can be better tolerated. Put another way, for the general case when the period of the polarised spectral modulation profiles is known but not their modulation phases (e.g. due to temperature effects), at least three polarisation dependent intensity measurement signals are needed to determine the fractional linear polarisation.

Although the first, second and third polarised spectral modulation profiles may be offset in phase from each other by substantially 120° in this embodiment to help provide maximum sensitivity, the profiles may be offset from each other by any phase. The more distributed the relative phases of the first, second and third of the said polarised spectral modulation profiles throughout a 360° cycle, the more efficiently the fractional linear polarisation can be determined from the first, second and third polarisation-dependent radiation intensity measurements and hence an offset of 120° may be most efficient.

Figure 6A:
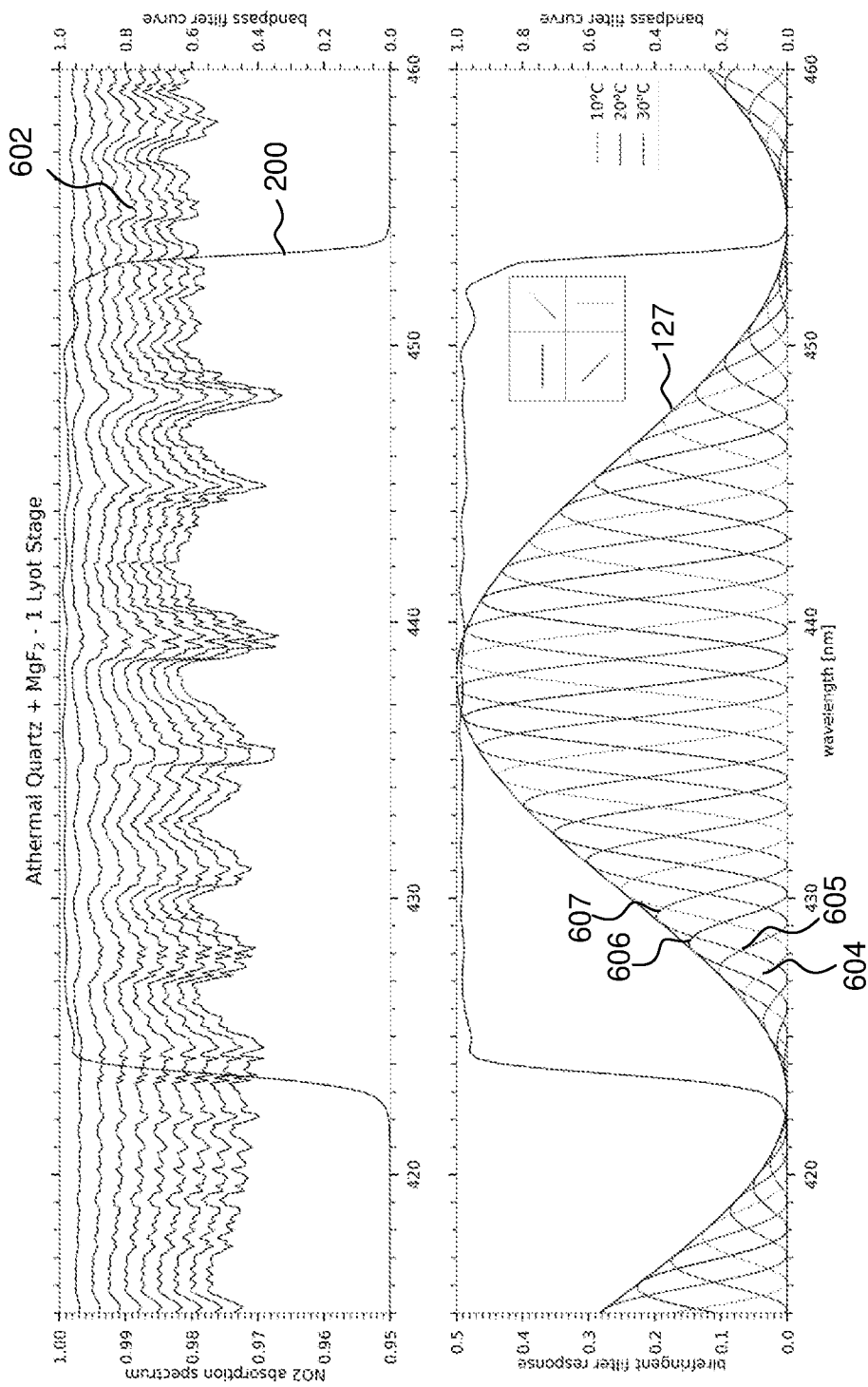
FIG. 6a is a plot showing an example of how a portion of the absorption spectrum of $NO_2$ matches the transmission response of a pre-filter comprising a bandpass interference filter and a one stage birefringent filter and the intensity signals corresponding to polarised spectral modulation profiles for linear polarisations of 0°, 45°, 90° and 135° for temperatures of the retarders of 10° C., 20° C. and 30° C., the retarders being provided in an athermal configuration.

In a further embodiment, radiation output from the spectral modulator 115 filtered for respective linear polarisation states corresponding to four polarised spectral modulation profiles may be detected, typically by respective detectors, typically simultaneously, the four polarised spectral modulation profiles being offset in phase from each other (similar to a four phase detection scheme in interferometry). FIG. 6a illustrates an example portion of the absorption spectrum 602 of $NO_2$ gas for different concentrations of $NO_2$ gas, and four signals 604-607 showing how the intensities of radiation output by the spectral modulator 115 and filtered for four respective linear polarisation angles at 0°, 45°, 90° and 135° varies in accordance with four respective polarised spectral modulation profiles. The first, second, third and fourth signals 604-607 (and corresponding polarisation-dependent spectral modulation profiles) which are adjacent to each other in phase are offset in phase from each other in phase by substantially 90°, the four signals 604-607 having relative phases of 0°, 90°, 180° and 270°. The frequency spacing between successive maxima of the polarisation-dependent spectral modulation profiles may be substantially equal to the frequency spacing between a pair of absorption peaks of the gas.

The Stokes parameters can be determined from the four polarisation dependent intensity measurements as follows. As there may be no circularly polarised radiation output by the spectral modulator 115, it is assumed that the V component of the Stokes vector is zero and the Stokes vector $[I_{meas}, Qm_{eas}, U_{meas}]^T$ may be used to describe the complete polarisation of the radiation output from the spectral modulator 115 as described below in Equations 6 and 7:

$$\begin{bmatrix} I_0 \\ I_{45} \\ I_{90} \\ I_{135} \end{bmatrix} = \frac{1}{2} \begin{bmatrix} I_{meas} + Q_{meas} \\ I_{meas} + U_{meas} \\ I_{meas} - Q_{meas} \\ I_{meas} - U_{meas} \end{bmatrix} \quad \text{(Equation 6)}$$

$$\begin{bmatrix} I_{meas} \\ Q_{meas} \\ U_{meas} \end{bmatrix} = \begin{bmatrix} \frac{1}{2}(I_0 + I_{90} + I_{45} + I_{135}) \\ I_0 - I_{90} \\ I_{45} - I_{135} \end{bmatrix} \quad \text{(Equation 7)}$$

Where $I_0$, $I_{90}$, $I_{45}$ and $I_{135}$ may be the first, second, third and fourth polarisation-dependent intensity signal measurement filtered at linear polarisation angles of 0°, 45, 90° and 135° respectively. The fractional linear polarisation, and optionally the angle of linear polarisation, may then be determined by the controller 120 as previously described and an absorption strength or concentration of the gas may be determined as described previously. Thus, again, the fractional linear polarisation data may comprise a measure of the fractional linear polarisation of the radiation output by the spectral modulator.

As before, the fractional linear polarisation of the emergent radiation from the spectral modulator 115 may be directly proportional to the strength of spectral features of the incident radiation. As radiation is detected at four different linear polarisation angles, the complete state of linear polarisation of the radiation may be determined and as a result there is no requirement for any of the four polarised spectral modulation profiles to be in phase or out of phase with the absorption features.

Detecting a first, second, third and fourth polarisation-dependent intensity measurement filtered at linear polarisation angles of 0°, 45°, 90° and 135° is the most efficient configuration to measure linear polarisation with four measurements (assuming that the transmissions are equal for all four angles; it will be understood that the 0° reference is still arbitrary). Many other combinations of linear polarisation angles may still allow the fractional linear polarisation (and optionally angle of linear polarisation) to be determined, albeit with reduced efficiency and sensitivity. Preferably, the fractional linear polarisation determined by the controller 120 is at least 5% of the average (e.g. mean) relative absorption depth of the absorption lines of the gas within the selected frequency range.

Although the examples in which at least three polarisation-dependent intensity measurements are obtained do not require alignment in frequency between maxima of polarised spectral modulation profiles to which they conform and absorption lines of the absorption spectrum of the gas (or with off-peak portions of the absorption spectrum), it can still be advantageous to implement an athermal retarder arrangement (i.e. comprising a combination of multiple retarder elements of different materials wherein the temperature dependences of their retardances cancel out) in order to maximise the accuracy of the gas concentration measurements which are possible with the apparatus, for example by reducing or eliminating measurement errors caused by temperature fluctuations causing corresponding fluctuations in retardances of the one or more retarders.

Figure 1B:
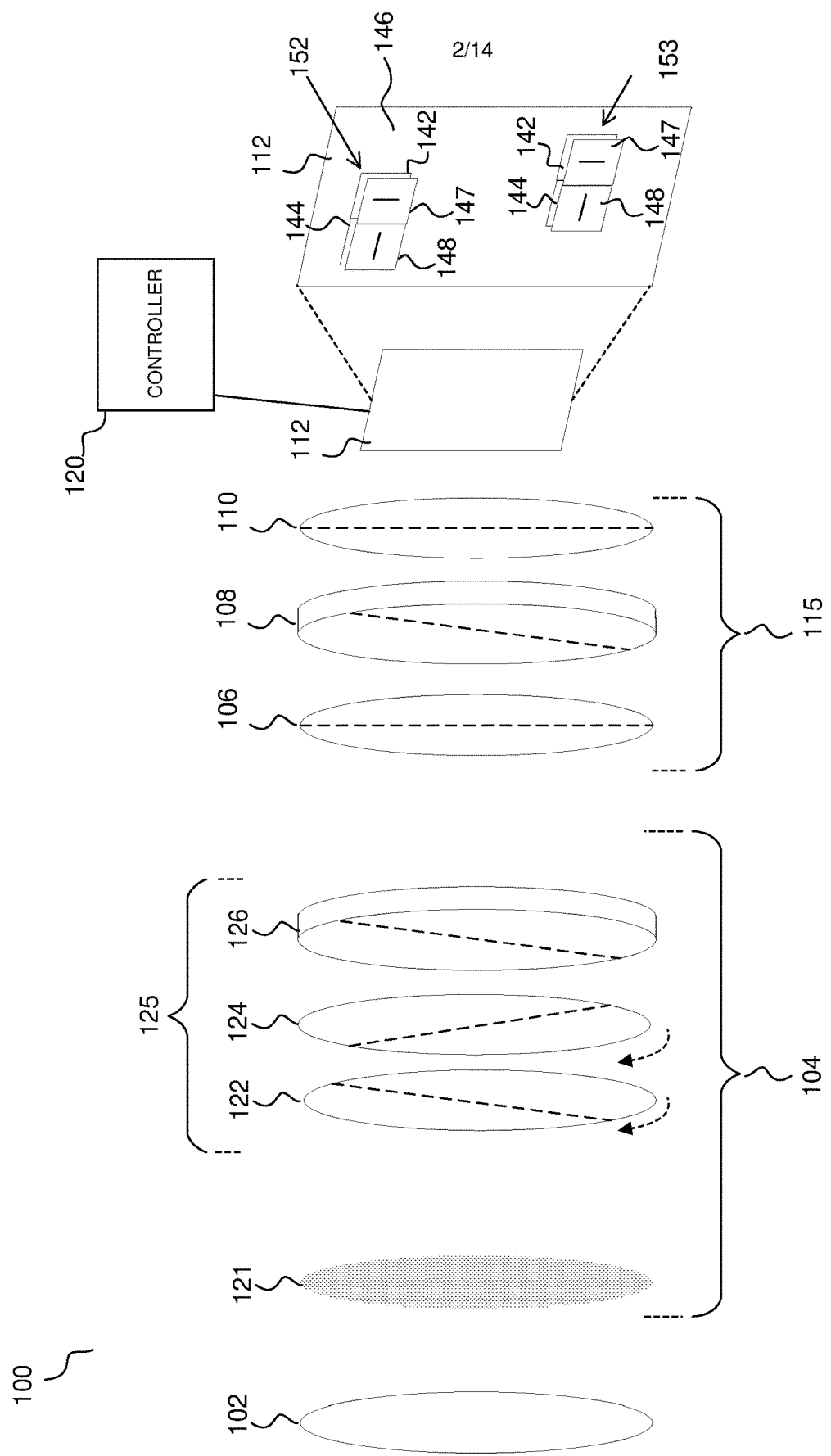
FIG. 1b schematically illustrates an apparatus to detect polarised radiation from which the presence of a gas can be determined, wherein the apparatus includes a telecentric lens and a birefringent filter.

As illustrated in FIG. 1b, the optical filter 104 of the apparatus of FIG. 1a may comprise a bandpass interference filter 121 and one or more birefringent filter stages 125. Each of the birefringent filter stages 125 may comprise a rotatable polariser 122, a retarder 126 and optionally a rotatable quarter waveplate 124. The retarder 126 may be a birefringent plate. The dashed lines on the optical elements demonstrate example optic axes of the optical elements, but it will be understood that these are examples only and different orientations of the optical axes of the optical elements are possible. The curved arrows indicate that the optical elements (including the polarisers, wave plates and retarders), or the optic axes of the optical elements, may be rotated, typically independently of each other, which is unlike a traditional Lyot filter. During assembly/tuning of the apparatus, the optic axes of the quarter wave plate 124, retarder 126 and polariser 122 may initially be aligned with the optic axis of the polariser 106 of the spectral modulator 115. However, the optic axis of the polariser 122 can be rotated (e.g. by rotating the polariser) to allow the transmission response of the birefringent filter 125 to be tuned to the profile of the bandpass interference filter 121. The optic axis of the polariser 106 can be rotated to tune the phases of the spectral modulation profiles to which the radiation detected by the detectors conform to the polariser angles of the detector, given a retardance of birefringent plate 108. The optical filter 104 is not limited to this configuration and may comprise any combination of rotatable and non-rotatable polarisers, wave plates and retarders. The arrows to indicate radiation travelling through the optical components have not been included in FIG. 1b for clarity, however the radiation may follow a similar path to that shown by the arrows in FIG. 1a. The rotational orientation and the thickness of the retarders and optical elements in the filter 104 may be chosen to refine the passband 200 of the bandpass filter 121 to provide a combined response 127 having deep minima of transmission at the edges of the passband of the bandpass filter 121, as illustrated in FIGS. 2 and 6a.

Figure 6B:
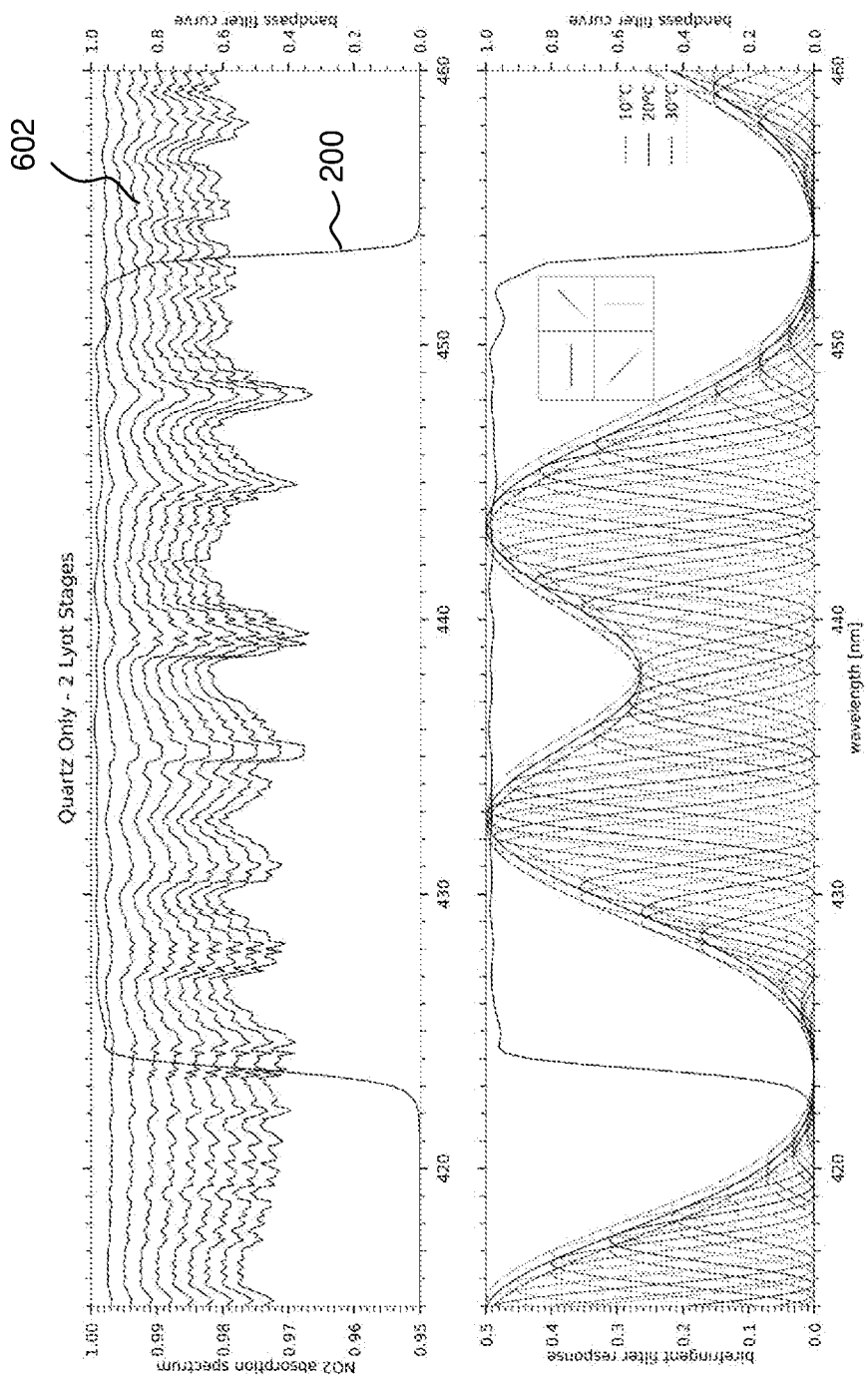
FIG. 6b illustrates a similar plot to FIG. 6a but where the pre-filter comprises a bandpass interference filter and a two-stage birefringent filter and the birefringent elements of the retarders, instead of being provided in an athermal configuration, are made from the same material (quartz)

Converging radiation from the telecentric objective lens 102 may be incident on the bandpass filter 121 which transmits radiation with frequencies within the passband 200 of the bandpass filter 121. The filtered radiation from the bandpass filter 121 is then incident on the polariser 122 (which, after rotation to tune the response of the birefringent filter to the bandpass filter, is typically fixed). The polariser 122 transmits radiation of a certain linear polarisation angle to the quarter waveplate 124 and birefringent plate 126. As described in relation to the spectral modulator 115 above, the position of the modulation depends on the polarisation angle because of the quarter wave plate 124, thereby allowing a tunable filter to be implemented. Although the order of the components in the birefringent filter 125 is reversed in comparison to the spectral modulator 115, this is merely for ease of alignment. A single birefringent stage 125 will provide a sinusoidal response which is typically selected to have a larger period than the response of the spectral modulator 115. This is illustrated in FIG. 6a. However, if a plurality of birefringent stages 125 are provided, a top-hat response can be obtained. This is illustrated in FIG. 6b which shows an example response 127 when two birefringent filter stages are provided. Accordingly, the birefringent stage(s) have the effect of refining the passband 200 of the bandpass interference filter 121 to provide the combined response 127. The polarisation angle of the polariser 122 may be different from that of the polariser 106 to provide the filter 104 with the desired response.

As a result of temperature dependency of the birefringent elements in the retarders and the birefringent filter 125, the response of the birefringent filter 125 and the spectral modulation phases (and thus the AoLP) of the polarised spectral modulation profiles may depend on temperature.

Figure 6C:
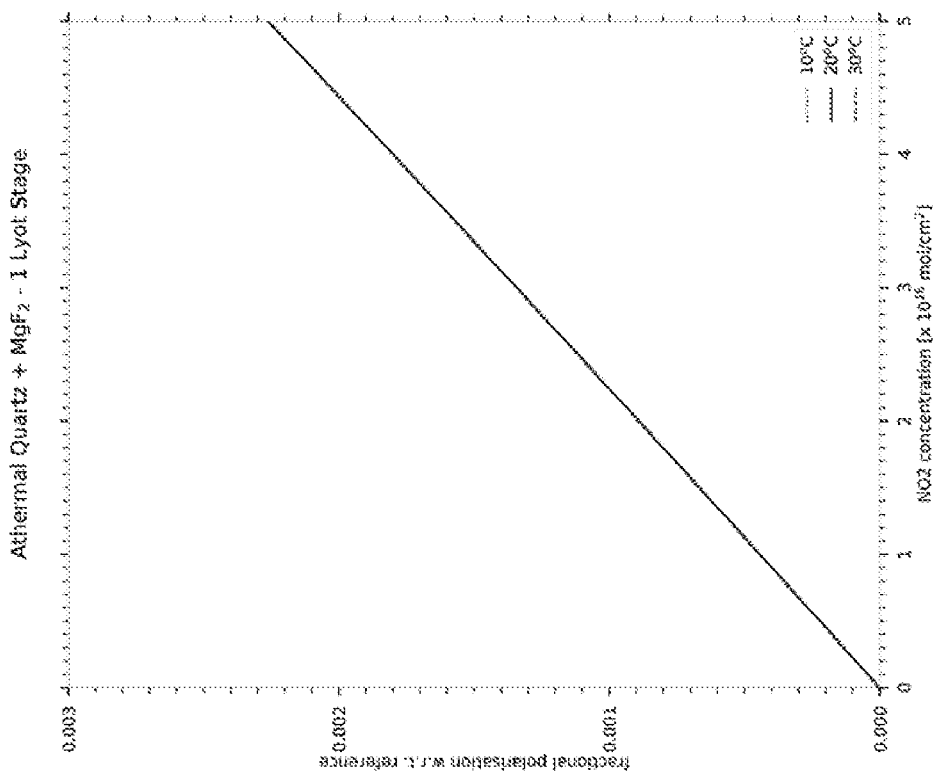
FIG. 6c shows plots of determined fractional linear polarisation with respect to a zero target gas concentration reference at a fixed temperature (e.g. 20° C.) versus $NO_2$ gas concentration for temperatures of 10° C., 20° C. and 30° C. wherein the birefringent elements of the apparatus are arranged in an athermal combination.

As discussed above, the apparatus may be made athermal by using an athermal crystal configuration in which, for example, the birefringent stage may comprise a plurality of retarder (e.g. birefringent) elements at least two of which have different retardances (e.g. birefringences), the said plurality of retarder (e.g. birefringent) elements being combined such that temperature dependent variations in retardance (e.g. birefringence) of the said plurality of retarder (e.g. birefringent) elements at least substantially cancel out. The results of such a configuration for apparatus temperatures of 10° C., 20° C. and 30° C. are shown in FIG. 6a, in which quartz and magnesium fluoride ($MgF_2$) crystals are combined in an athermal combination (in both the birefringent filter 125 and the spectral modulator 115) such that the response of the filter 125 and the spectral positions of the polarised spectral modulation profiles for each of those temperatures are substantially the same. This makes for a very stable system, allowing consistently accurate measurements to be obtained with a calibration plot obtained at a single temperature as illustrated by FIG. 6c which shows plots of fractional linear polarisation of radiation output by the athermal spectral modulator 115 versus $NO_2$ concentration for three different temperatures: 10° C., 20° C. and 30° C. (which match each other strongly).

It has been observed when determining calibration plots that, even when a zero concentration of the target gas (e.g. $NO_2$) is observed using the techniques described above, a non-zero value of fractional linear polarisation may be observed. In this case, the fractional linear polarisation determined by the controller 120 from which the gas concentration is determined, and also the calibration reference, may be adapted for a zero target gas concentration reference. That is, during calibration, a measurement of $Q_{meas}/I_{meas}$ and $U_{meas}/I_{meas}$ is made for a zero concentration of the target gas (e.g. $NO_2$) in the calibration volume. These values of $Q_{meas}/I_{meas}$ and $U_{meas}/I_{meas}$ are then stored to provide zero target gas concentration reference values, $Q_{meas}/I_{meas}$_ref and $U_{meas}/I_{meas}$_ref. These reference values are then taken into account when determining the fractional linear polarisation of radiation output by the spectral modulator 115, both when calculating the fractional linear polarisation values for the calibration curve and when calculating fractional linear polarisation values from which the presence of gas can be determined in the gas measurement volume. This may be done as follows. $Q_{meas}/I_{meas}$ and $U_{meas}/I_{meas}$ are determined as before. However, before rotation of the [Q, U] co-ordinate system, $Q_{meas}/I_{meas}$_ref and $U_{meas}/I_{meas}$_ref are first of all subtracted from $Q_{meas}/I_{meas}$ and $U_{meas}/I_{meas}$ respectively. Then, when the co-ordinate system is rotated, $Q_{meas}'/I_{meas}$ will be indicative of the fractional linear polarisation of the radiation output by the spectral modulator 115 with respect to the zero target gas concentration reference. This value may then be compared to the similarly determined calibration curve to determine the concentration of the gas in the gas measurement volume. Thus, in this case, the fractional linear polarisation data may comprise a measure of the fractional linear polarisation of the radiation output by the spectral modulator with respect to a zero target gas concentration reference.

The values of fractional linear polarisation in FIG. 6c are values of fractional linear polarisation of the radiation output by the spectral modulator 115 with respect to the zero target gas concentration reference determined in this way. As the apparatus used to determine the plots of FIG. 6c uses athermal birefringent crystal combinations, the zero target gas concentration reference need only be determined at a single reference temperature. This reference can then be used in subsequent determinations of fractional linear polarisation regardless of the temperature of the apparatus.

As an alternative to using such athermal combinations of birefringent elements, all of the retarder (e.g. birefringent) elements of the filter 125 and the spectral modulator 115 may be made from the same crystal material, such as quartz. In this case, the responses of each of the retarder elements vary in the same way with temperature. Thus, the response 127 of the birefringent filter 125 and the polarised spectral modulation profiles shift in frequency by substantially the same amount (and with the same polarity) as a function of temperature. This is shown in FIG. 6b which shows the response of the birefringent filter 125 and the polarised spectral modulation profiles spectrally shifting by the substantially same amount in frequency as a function of temperature from 10° C. to 30° C., the birefringent elements of the birefringent filter 125 and spectral modulator 115 all being made from quartz. As a result, and because there are deep minima in the response of the birefringent filter 125 at the lower and upper cut-off frequencies of the bandpass filter 121, the intensity measurements made by the detectors are not significantly affected by fluctuations in temperature of the apparatus, allowing accurate measurements to be obtained.

Additionally or alternatively, the effects of temperature may be compensated for by measuring the temperature of the apparatus and taking the measured temperature into account when determining the fractional linear polarisation from which presence of the gas (and typically gas concentration) is determined. For an apparatus which does not use an athermal birefringent crystal arrangement, it may be that the zero target gas concentration reference changes as a function of temperature. It may be that different zero target gas concentration references are determined for different temperatures of the apparatus during a calibration phase. In this case, when measurements of $Q_{meas}/I_{meas}$ and $U_{meas}/I_{meas}$ are made, it may be that the temperature of the apparatus is measured (either directly or by calculating the AoLP which varies with temperature) and the appropriate zero target gas concentration reference is selected in dependence on the measured temperature. The appropriate zero target gas concentration reference may then be taken into account to determine fractional linear polarisation of the detected radiation as above. Temperature of the apparatus can thus be taken into account to thereby more accurately determine the concentration of the gas. In this case, the fractional linear polarisation data may comprise a measure of the fractional linear polarisation of the radiation output by the spectral modulator with respect to a temperature dependent zero target gas concentration reference.

Figure 6D:
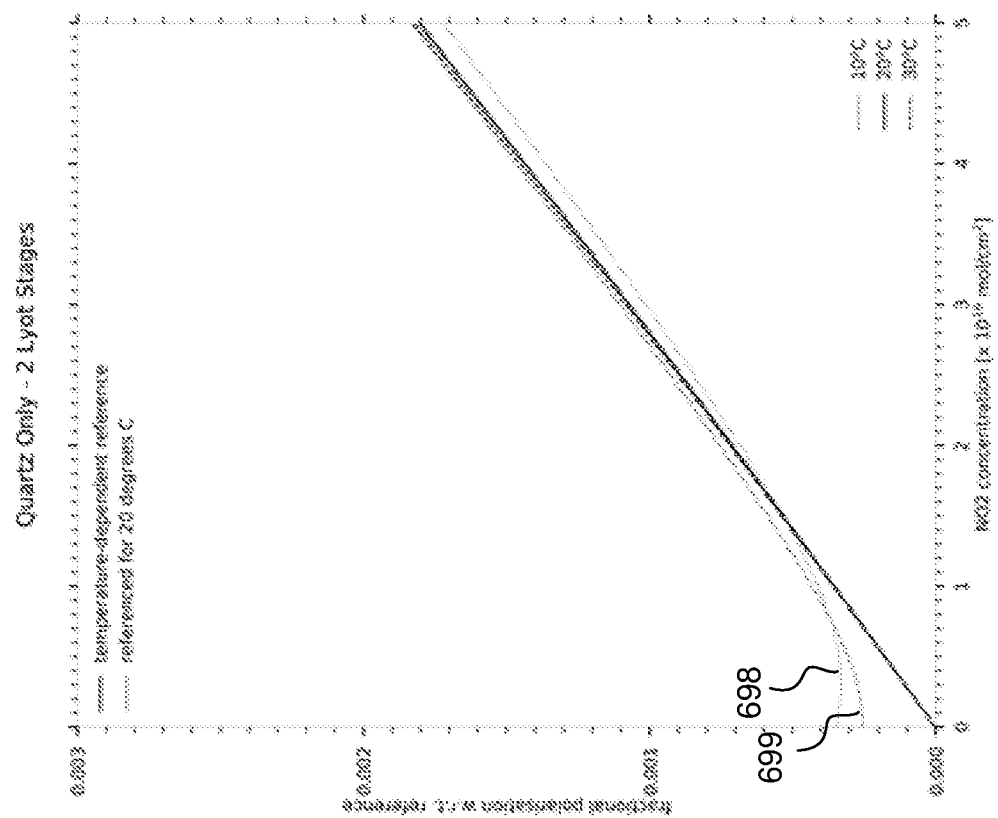
FIG. 6d shows plots of determined fractional linear polarisation with respect to a temperature dependent zero target gas concentration reference for apparatus temperatures of 10° C., 20° C. and 30° C., and of determined fractional linear polarisation with respect to a 20° C. zero target gas concentration reference versus $NO_2$ gas concentration for apparatus temperatures of 10° C., 20° C. and 30° C.

This is illustrated in the plots of FIG. 6d which shows, for the arrangement to which FIG. 6b relates in which the birefringent elements of the birefringent filter and retarder(s) are each formed from the same material (in this case quartz), plots of fractional linear polarisation with respect to a temperature dependent zero target gas concentration reference versus $NO_2$ gas concentration for measured temperatures of 10° C., 20° C. and 30° C. As shown in FIG. 6d, these plots overlap with each other almost completely, indicating that temperature has been accurately accounted for. For illustration, the fractional linear polarisations determined at 10° C. and 30° C. with respect to a zero target gas concentration reference at 20° C. are shown at 698 and 699 respectively in FIG. 6d. The deviation of the plots 698, 699 from the other plots of FIG. 6d illustrate the improvements in accuracy which can be achieved by employing a temperature dependent zero target gas concentration reference.

Referring back to FIG. 1a, it may be that the detection apparatus 112 comprises a plurality of groups 152, 153 of radiation detectors, each of the said groups comprising a respective pair of radiation detectors 142, 144 to detect radiation output from the one or more retarders 108 filtered by respective linear polarisers 146, 148, such as linear polarisers of a respective group of linear polarisers, for respective linear polarisation states, the radiation incident on the detectors of the different groups corresponding to different parts of a scene. Typically the plurality of groups of radiation detectors are configured to detect radiation output from the one or more retarders 108 filtered by respective linear polarisers separately and selectively at the same time as each other. The plurality of groups of radiation detectors may be provided in a common (e.g. two dimensional) array of radiation detectors. In this example, each of the groups 152, 153 is intended to detect radiation filtered for first and second linear polarisation angles of 0° and 90° to thereby make first and second polarisation dependent intensity measurements from which the presence of the gas can be determined as set out above in respect of FIG. 1a. Thus each of the said groups 152, 153 selectively detect polarised radiation conforming to each of first and second of the said polarised spectral modulation profiles (relating to linear polarisation angles of 0° and 90° respectively) to thereby provide respective first and second polarisation-dependent radiation intensity measurements from which the presence of the gas can be determined. As shown in FIG. 1, the radiation detectors of the plurality of groups may be (but are not necessarily) provided on a common focal plane to thereby provide a compact apparatus. It may be that the radiation detectors of the plurality of groups are provided in a tessellated or pixelated arrangement. The polarisers may be provided in a tessellated arrangement in a common focal plane, for example in a common (e.g. two dimensional) array of polarisers, for example provided over the radiation detectors of the respective groups.

It may be that the groups of detectors are arranged in a periodic tessellated arrangement, the periodicity of the tessellated arrangement being in respect of the linear polarisation angles of radiation which the detectors of the groups are configured to detect. The periodicity may be in a common focal plane on which the groups of detectors are provided. It may be that the corresponding groups of polarisers are provided in a periodic tessellated arrangement, the periodicity being in respect of the linear polarisation angles of the said groups of polarisers. The periodicity may be in a common focal plane on which the groups of detectors are provided. It may be that the controller 120 is to determine, for each of the said groups, the presence of the gas (preferably the absorption strength of the gas) and, in dependence on the said determinations, to determine a (typically two-dimensional) image selectively indicating presence of gas (preferably relative absorption strengths of the gas) at a plurality of locations across the image. It may be that the controller 120 is configured to output the said two-dimensional image to a user interface such as a monitor screen.

It may be that the said plurality of groups of radiation detectors comprises a first group arranged to receive radiation incident on the objective lens 102 at a first angle of incidence and a second group arranged to receive radiation incident on the objective lens 102 at a second angle of incidence different from the first angle of incidence. It may be that the first and second angles of incidence are offset from each other by at least 45°. By detecting received radiation at different angles of incidence by the apparatus 100, multi-axis differential optical absorption spectroscopy (MAX DOAS) may be performed on the detected signals using a single pixelated detector array. It may be that the detector array is tilted to enable detection of radiation at the required angles of incidence. In this case, it may be that the telecentric objective lens 102 would need to be replaced by a non-telecentric objective lens. This is explained in more detail with reference to FIG. 7 below.

Although the groups of FIG. 1*a* each comprise a pair of detectors with a corresponding pair of linear polarisers, it will be understood that each group may contain more than two detectors with corresponding linear polarisers. For example, each of the groups may comprise at least three detectors and corresponding linear polarisers or at least four detectors and corresponding linear polarisers. For example, each of the groups may comprise three detectors and three corresponding linear polarisers of linear polarisation angle 0°, 60° and 120° such that the detectors of each group detect polarised radiation conforming to the respective polarised spectral modulation profiles associated with those linear polarisation angles to thereby provide three polarisation dependent intensity measurements from which presence (and typically concentration) of the gas can be determined as described above.

Figure 5A:
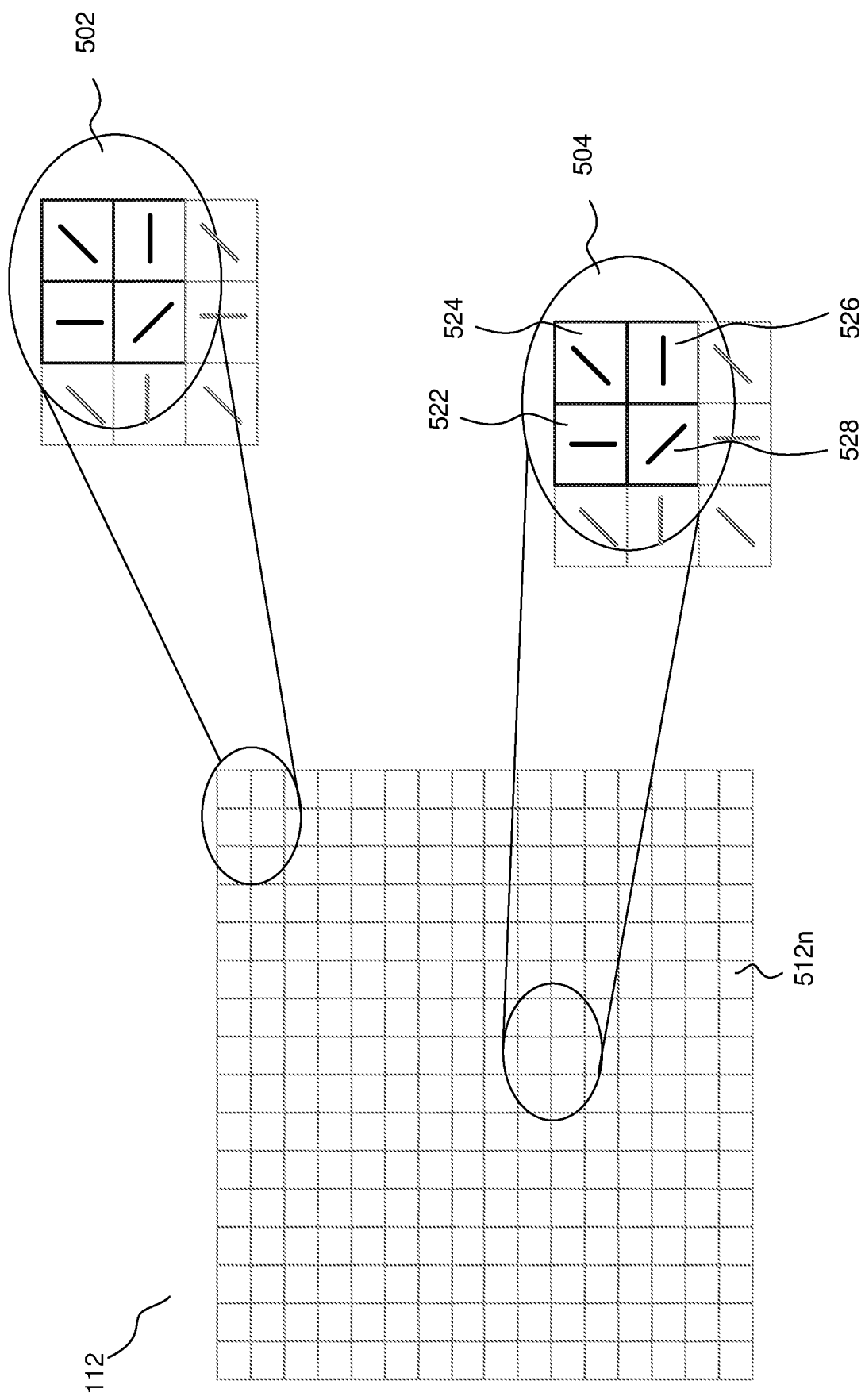
FIG. 5a schematically illustrates a tiled array of radiation detectors to detect four different polarisations of radiation.
Figure 5B:
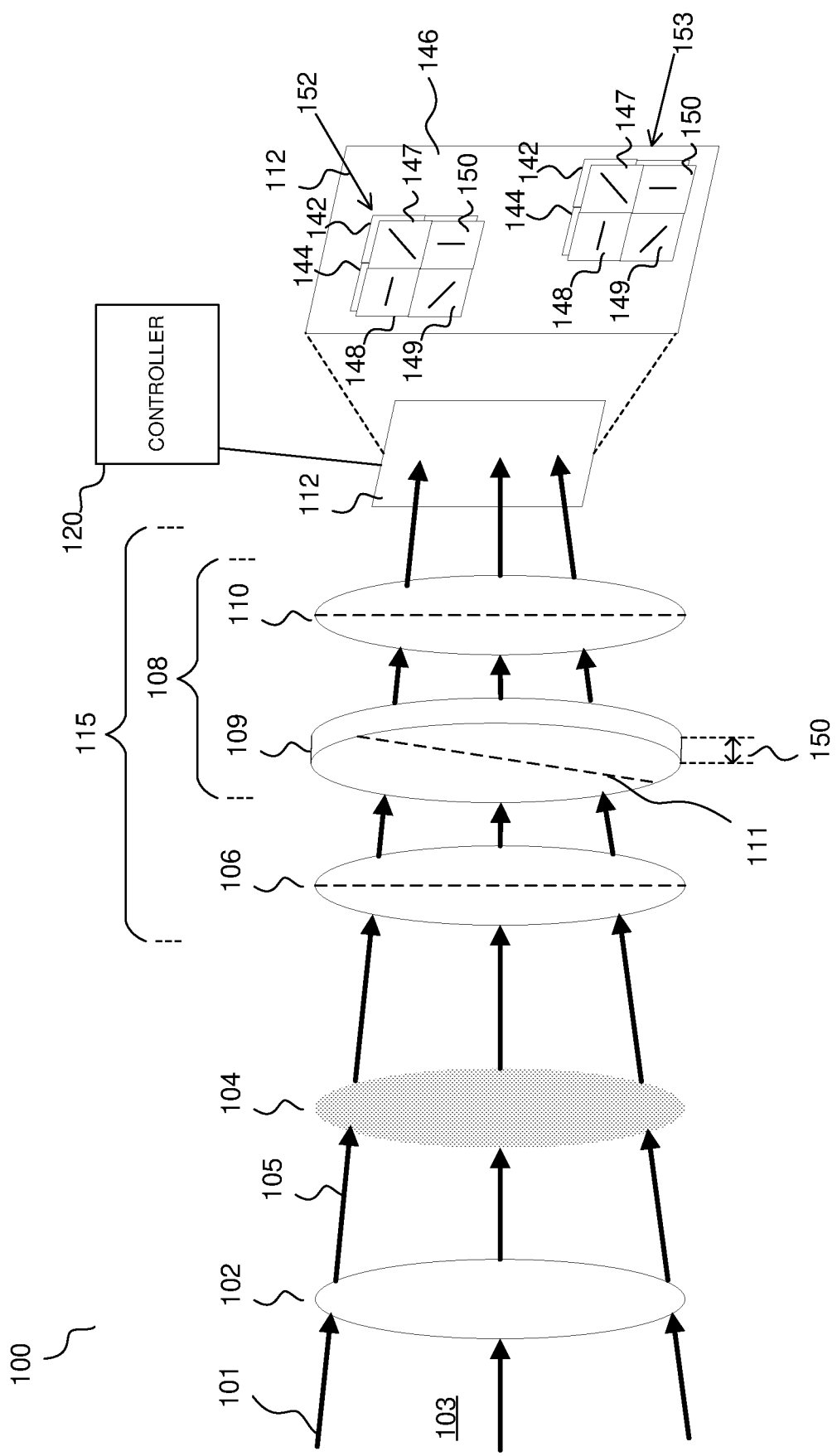
FIG. 5b schematically illustrates an apparatus to detect polarised radiation from which the presence of a gas can be determined, wherein the apparatus includes groups of four radiation detectors with corresponding groups of four micropolarisers provided over the radiation detectors of a corresponding group of radiation detectors.

In another example, each of the groups may comprise four detectors and four corresponding linear polarisers of linear polarisation angle 0°, 45°, 90° and 135° such that the detectors of each group detect polarised radiation conforming to the respective polarised spectral modulation profiles associated with those linear polarisation angles to thereby provide four polarisation dependent intensity measurements from which presence (and typically concentration) of the gas can be determined as described above. FIG. 5*a* schematically illustrates an example micropolariser array which may comprise a plurality of linear polarisers 512*n*. The micropolariser array can be provided over a detector array such that there is a 1:1 correspondence between linear polarisers 512*n* and detectors of the array. As shown in FIG. 5*b*, the plurality of detectors may comprise a plurality of groups 152, 153 of radiation detectors and as shown in both FIGS. 5*a* and 5*b* the plurality of micropolarisers may comprise a plurality of groups of linear polarisers. 502 and 504 illustrate examples of groups of micropolarisers of the micropolariser array in FIG. 5*a*, however the micropolariser array is not limited to comprise only two groups of linear polarisers and may alternatively comprise one group or more than two groups. Each of the plurality of groups may comprise a first 522, second 524, third 526 and fourth 528 linear polarisers. The respective micro-polarisers may have linear polarisation angles of 0°, 45°, 90° and 135° respectively, thereby causing the respective detectors with which they are associated to detect radiation conforming to polarised spectral modulation profiles of relative phases 0°, 90°, 180° and 270°. The detected 0°, 45°, 90° and 135° linearly polarised radiation by each group of radiation detectors over which the groups 502, 504 of micropolarisers are provided corresponds to first, second, third and fourth polarisation-dependent radiation intensity measurements respectively from which presence of the gas, absorption strength of the gas and gas concentration can be determined (see above).

As shown in FIG. 5*b*, the groups 502, 504 of linear polarisers 512*n* and the corresponding groups 152, 153 of detectors may be provided on a common focal plane. The groups of linear polarisers and the corresponding groups of radiation detectors may be provided adjacent to each other in a tessellated arrangement to form a repeating 2×2 arrangement of radiation detectors. For each of the groups of radiation detectors, the presence of a gas may be determined by a controller 120 processing the first to fourth polarisation dependent intensity measurements as discussed below. For each group 152, 153 of detectors 512*n*, there may be first, second, third and fourth polarisation-dependent radiation intensity measurements and the controller 120 may determine the fractional linear polarisation to determine an absorption strength of the gas (e.g. $NO_2$). The controller may determine, using the measurements from each of the groups of the radiation detectors, a two-dimensional image of the relative absorption strength of the gas at a plurality of locations across the image. The controller may output the two-dimensional image to a user interface (e.g. monitor screen).

By determining the fractional linear polarisation from four polarisation-dependent intensity measurements, a 2×2 micropolariser array pattern can be provided on the detectors. Such a tessellation pattern is easier to implement over a relatively large pixelated array of detectors than, for example, a 2×1 pattern. In other embodiments, repeating 2×3 or 2×4 micropolariser array patterns may be provided over a pixelated detector to provide groups of eight polarisation dependent intensity measurements from which the presence of the gas can be determined. In this case, the angles of linear polarisation of the respective micropolarisers of each 2×4 array pattern may be offset from each other by 22.5° so that the corresponding polarised spectral modulation profiles are offset from each other by 45°. Again, this provides an efficient tessellation pattern for a large pixelated detector array.

By a plurality of groups of linear polarisers and corresponding radiation detectors, periodically arranged in respect of the linear polarisation angles of radiation which the detectors of the groups are configured to detect or in respect of the linear polarisation angles of the said groups of polarisers, detecting radiation filtered for particular polarisation states at different points in space in accordance with a specific pattern, an additional spatial modulation of the received radiation is provided which enables the polarisation pattern, and therefore the gas detection or gas concentration pattern, to be measured across a focal plane. As well as providing information about the gas content across an area of space, this additional spatial modulation can also help to increase spatial resolution and remove or reduce systematic errors, for example from the polarisation-dependent radiation intensity measurements or in fractional polarisation measurements from which the presence of gas may be determined. In this case, the polarisation modulation provided by the one or more retarders may provide the received radiation with polarised spectral modulation profiles which allow the presence of the gas can be determined, while the additional spatial modulation helps to improve the accuracy with which radiation conforming to those profiles can be measured. Making measurements by the plurality of groups also allows an image to be determined of the relative absorption strength of the gas at a plurality of locations across the image.

It may be that the presence (and typically absorption strength or concentration) of the gas is determined once per group (or repeating pattern) of detectors. However, in order to improve the spatial resolution of the image and to reduce or avoid aliasing, it may be that the controller 120 is programmed to determine whether gas is present for each detector of the array. In order to do this, the controller 120 takes into account signals detected by proximal (e.g. neighbouring) detectors which conform to different spectral modulation profiles from the pixel in question to enable the fractional linear polarisation to be estimated for each pixel as above. The controller 120 may be configured to use a polarisation-dependent radiation intensity measurement from one detector in the determination of the presence of the gas for a plurality of (e.g. two or more, three or more or four or more) positions in the focal plane.

The controller 120 may be configured to use a polarisation-dependent radiation intensity measurement from each of a plurality of detectors in the determination of the presence of the gas for a respective plurality of positions in the focal plane. This may be facilitated by the additional spatial modulation provided by the periodic tessellated arrangement of the detectors, the periodicity of the tessellated arrangement being in respect of the linear polarisation angles of radiation which the detectors of the groups are configured to detect. For example, the controller 120 may be configured to determine whether gas is present in respect of a first position on the focal plane depending on polarisation-dependent radiation intensity measurements by at least a first one of the radiation detectors and a second one of the radiation detectors, and to determine whether gas is present in respect of a second position on the focal plane depending on polarisation-dependent radiation intensity measurements by at least the first one of the radiation detectors and a third one of the radiation detectors different from the second one of the radiation detectors. It may be that the controller 120 is to determine the presence of the gas at a first position in dependence on polarisation-dependent radiation intensity measurements by at least a first detector, a second detector and a third detector and at a second position in dependence on polarisation-dependent radiation intensity measurements by at least the first detector, the second detector and a fourth detector different from the third.

As well as permitting an increase in the spatial resolution of the image and reducing or avoiding aliasing, this technique can also reduce systematic errors, particularly if the plurality of groups of radiation detectors are periodically arranged across the focal plane in respect of the linear polarisation angles of radiation which the detectors of the groups are configured to detect.

It may be assumed that the gas concentration varies smoothly, and therefore that the fractional linear polarisation varies smoothly (e.g. at a frequency greater than the individual pixel level or at a frequency greater than the spatial modulation frequency) across the radiation detectors of the plurality of groups (e.g. over the focal plane of the detector array). As such, a systematic issue with an individual pixel can be mitigated by the spatial modulation. In the Fourier domain, this can be thought of as considering information at a predefined spatial modulation carrier frequency (i.e. the frequency with which the polarisation is spatially modulated across the detectors) and removing or discarding information at frequencies which differ (or which differ significantly) from the predefined spatial modulation carrier frequency (which may be information from individual pixels producing systematic errors).

As an alternative way to increase the spatial resolution of the image, fractional linear polarisations estimated for each group or repeating pattern can be interpolated to provide estimated fractional linear polarisations for each detector of the array.

Figure 4A:
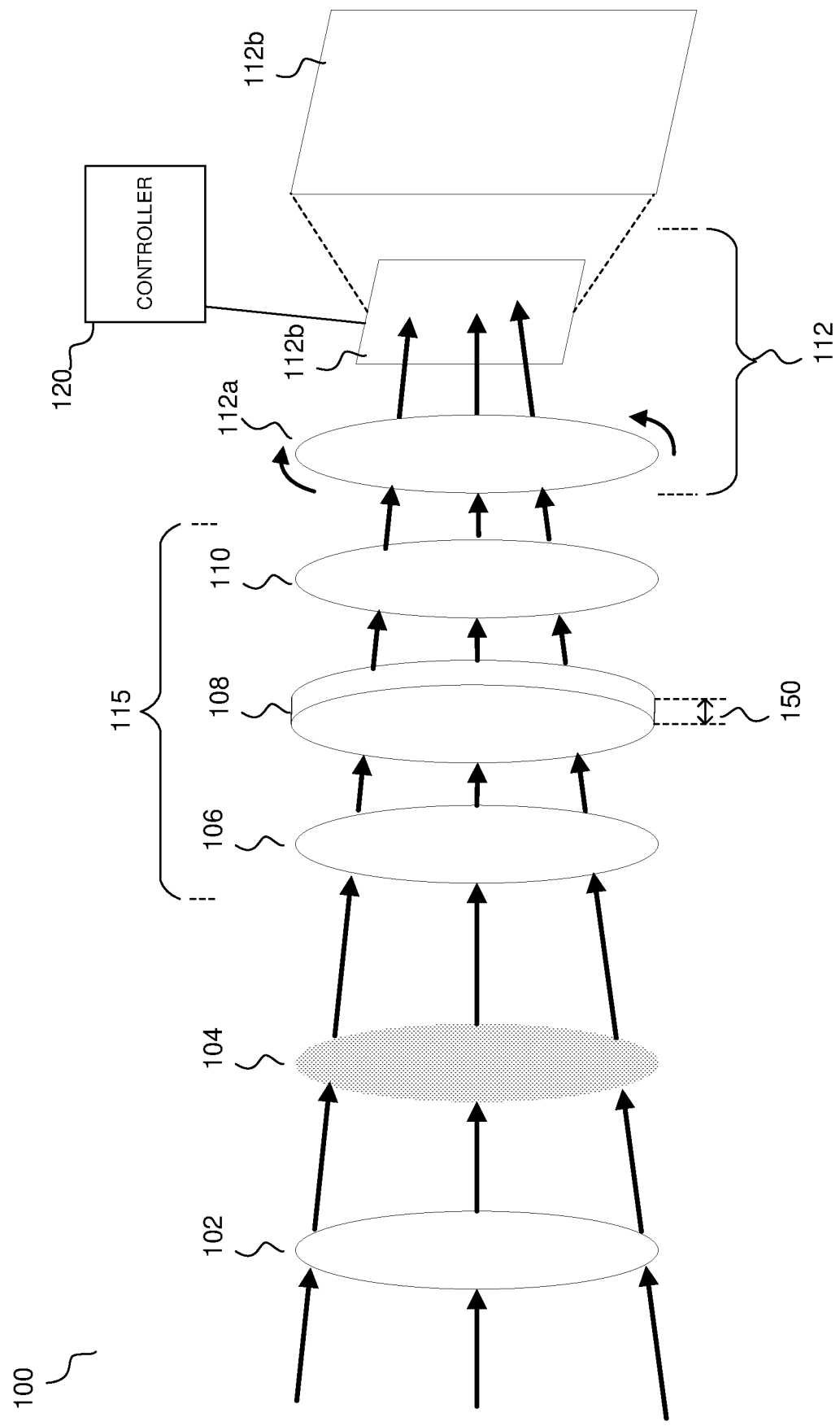
FIG. 4a schematically illustrates an apparatus to detect polarised radiation from which the presence of a gas can be determined, wherein the apparatus includes a telecentric lens and a rotating polarisation filter.

As illustrated in FIG. 4a, an alternative detection apparatus 112 may be provided which comprises an adjustable polariser 112a and a radiation detector 112b. The adjustable polariser 112a may be used to filter the radiation sequentially at different linear polarisation angles before it is detected by one or more co-planar detectors provided at a detector plane 112b. The adjustable polariser 112a may be a rotatable polariser which rotates to sequentially transmit different polarisations of radiation. This may result in the polarisation of the radiation by the one or more detectors varying with time. The polarisation dependent intensity measurements are made by the detection apparatus 112 in this case by filtering the radiation incident on the detection apparatus at different linear polarisation angles by virtue of the adjustable polariser 112a transmitting radiation of different linear polarisations to the detectors at the detector plane 112b over time. For example, in order to implement a similar example to the first example described above in which two polarisation dependent intensity measurements are made by filtering radiation from the spectral modulator 115 at two different angles of linear polarisation using two separate fixed angle polarisers and two detectors, the adjustable polariser 112a may be provided in a first rotational orientation to transmit only linearly polarised radiation at 0° for a first time period. Within this first time period the linearly polarised radiation at 0° is incident on the detectors at the detector plane 112b and one or more detectors at the detector plane 112b may provide a first polarisation dependent intensity measurement. The linear polarisation angle of the adjustable polariser 112a may then be rotated so that the adjustable polariser 112a is rotationally orientated to transmit radiation linearly polarised at 90°. For a second time period the 90° linearly polarised radiation is incident on the one or more detectors at the detector plane 112b and one or more detectors at the detector plane 112b may provide the second polarisation dependent intensity measurement. Based on the first and second polarisation-dependent intensity signal measurements presence or absorption strength or concentration of the gas can be determined as before. The adjustable polariser 112a is not limited to only transmit linearly polarised radiation at 0° and 90°, and may be used to transmit radiation linearly polarised at any angle, allowing the detection apparatus 112 of FIG. 4a to be used as an alternative to separate fixed angle linear polarisers in any of the embodiments described above.

Figure 4B:
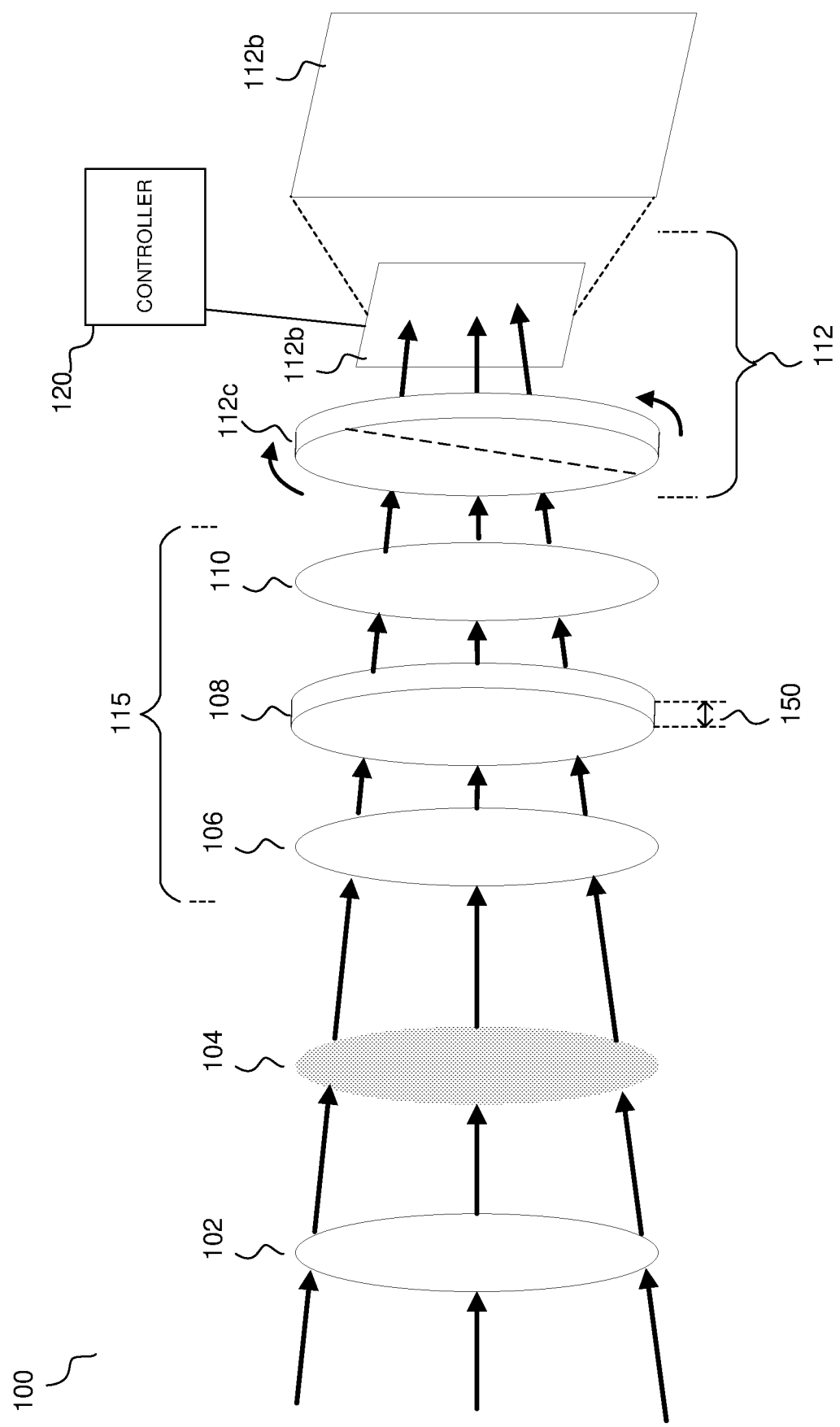
FIG. 4b is a similar diagram to FIG. 4a, but with a rotating half waveplate and fixed linear polarisation angle polariser in place of the rotating polarisation filter.

As an alternative to providing a rotatable polariser 112a, as shown in FIG. 4b a rotatable (typically rotating) half wave plate 112c may be used in combination with a fixed linear polariser in front of the detector 112b, to perform the same purpose as the adjustable polariser 112a to allow sequential detection of radiation at different polarisation angles by one or more detectors.

Temporally modulating the polarisation of radiation detected by the detector plane 112b (rather than detecting radiation filtered for different polarisations at the same time) may have the advantage that the polarisation-dependent intensity measurements may be independent from specific transmissions and gains from different individual radiation detectors on the detection apparatus, or individual pixels. However, measurements taken in sequence rather than in parallel may be susceptible to time variations in the scene which is being imaged and in the illumination.

The detector plane 112b may be any suitable radiation detector which may measure intensity of linearly polarised radiation at any polarisation angle and can distinguish signals measured over a different time frame.

As well as providing an alternative to fixed angle linear polarisers provided over radiation detectors as discussed above, modulating the polarisation state of radiation transmitted from the spectral modulator 115 to the detector(s) over time can be used to provide an additional stage of modulation to fixed angle polarisers provided over respective detectors which can help remove systematic errors in the determination of the presence of the gas, and from gas concentration measurements. This is because, by modulating the polarisation state of radiation transmitted from the spectral modulator 115 over time, the component of radiation output by the spectral modulator 115 whose polarisation angle is modulated by the temporal polarisation modulator to a linear polarisation angle which is transmitted by the linear polariser(s) provided over the detector(s) changes over time. Accordingly, the same detector(s) 112, 112b can be made to detect radiation output by the spectral modulator 115 at different angles of linear polarisation over time. Thus, the same detector(s) 112, 112b can be made to detect radiation output by the spectral modulator 115 conforming to different polarised spectral modulation profiles over time. This helps to remove or at least reduce the said systematic errors. For example, it may be that for a first time period the polarisation state of radiation transmitted from the spectral modulator 115 to the detector(s) may cause a first radiation detector to detect radiation filtered for a first linear polarisation angle and a second radiation detector to detect radiation filtered for a second linear polarisation angle different from the first linear polarisation angle in order to provide first and second polarisation dependent intensity measurements. These measurements may then be used to determine fractional linear polarisation, and thus the presence of the gas. In order to determine whether the first or second detectors are responsible for any systematic errors, the polarisation state of radiation transmitted from the spectral modulator 115 to the detectors may be modulated differently such that for a second time period the first detector is caused to detect radiation filtered for the second linear polarisation angle and the second radiation detector to detect radiation filtered for the first linear polarisation angle in order to provide third and fourth polarisation dependent intensity measurements. These measurements may then be used to determine fractional linear polarisation, and thus the presence of the gas. As discussed above, the determination of the fractional linear polarisations may in each case involve a subtraction operation between the first and second, and fourth and third, polarisation dependent intensity measurements. As the first and fourth and second and third polarisation dependent intensity measurements should be substantially the same as each other, the outputs of the respective subtraction operations should be substantially the same as each other. However, if either of the detectors is responsible for causing a systematic error, this may not be the case. Thus, a systematic error caused by either detector can be identified. The controller 120 may then readily remove or reduce the systematic error, for example by omitting information from the detector causing the error in the determination of fractional linear polarisation.

Additionally or alternatively, a periodic temporal modulation of the polarisation output from the spectral modulator 115 to the detectors can provide additional information similar to that of the spatial modulation discussed herein by way of which systematic errors can be reduced.

As mentioned above, FIG. 7 illustrates a modification of the apparatus 100 in which the telecentric objective lens 102 is replaced by a non-telecentric lens 702. Radiation received and output by the non-telecentric lens 702 may be incident on filter 104, and hence the spectral modulator 115, at an angle of incidence which is dependent on its angle of incidence on the non-telecentric lens 702. The spectral modulator 115 acts as previously described to provide radiation having a polarisation state spectrally modulated in accordance with a plurality of polarised spectral modulation profiles, each associated with a different linear polarisation angle. In addition, the birefringence of the one or more retarders 108 is dependent on the angle of incidence of radiation. This is described by the following formula for calculating the phase delay of a birefringent crystal for radiation of wavelength λ:

$$\Delta\phi = 2\pi/\lambda[n_e(\theta) - n_o]$$

where $\Delta\phi$ is the phase delay, $\theta$ is the angle of incidence, $n_e$ is the refractive index of the extraordinary axis of the crystal (which is angle of incidence dependent) and no is the refractive index of the ordinary axis of the crystal.

In addition, the path length through the retarders 108 varies with angle of incidence.

This provides a further (angular) stage of modulation on the polarisation of radiation such that the polarisation of radiation output from the spectral modulator 115 filtered for the same linear polarisation angle, but which was incident on the one or more retarders 108 at different angles of incidence, is spectrally modulated in accordance with respective (different) polarised spectral modulation profiles associated with the same linear polarisation angle but which are offset in phase from each other. Similarly to the additional spatial modulation, this allows additional information to be obtained, which helps to remove or at least reduce systematic errors.

Figure 7:
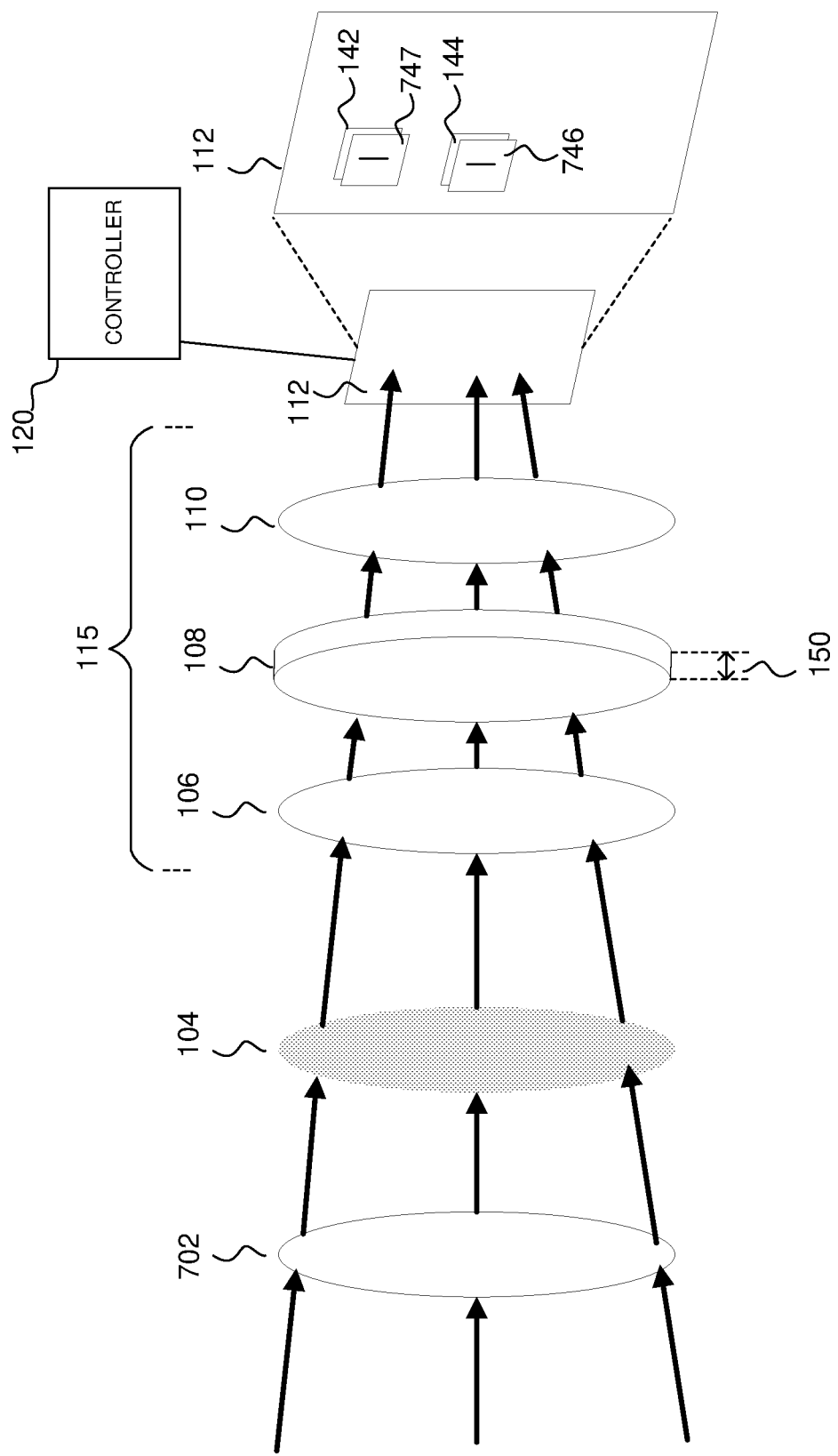
FIG. 7 schematically illustrates an optical set-up to detect polarised radiation from which the presence of a gas can be determined using a non-telecentric lens.

As before, radiation detected at linear polarisation angles associated with the polarised spectral modulation profiles may have an intensity which varies in accordance with the respective polarised spectral modulation profile. Such polarisation filtered radiation may be detected to provide polarisation-dependent radiation intensity measurements at the radiation detection apparatus 112. Accordingly, in the present embodiment, two or more of the first, second (and third and/or fourth and so on) polarisation dependent intensity measurements from which the gas can be detected may be radiation filtered for the same angle of linear polarisation but incident on the one or more retarders 108 at different angles of incidence. This is illustrated in FIG. 7 by fixed polarisers 746, 747 over first and second detectors 142, 144 having the same linear polarisation angle of 0°. From the polarisation-dependent intensity signal measurements the fractional linear polarisation may be calculated using the above equations as previously described. This fractional linear polarisation may then be converted into an absorption strength of the gas using a calibration curve or any other suitable method. As before, the more distributed the phases of the polarisation filtered radiation which is detected by the detector throughout a 360° cycle, the more efficient the fractional linear polarisation measurement will be and the more sensitively gas can be detected.

In some embodiments, polarisation dependent intensity measurements may be obtained from radiation filtered for each of a plurality of linear polarisation angles, but for each linear polarisation angle multiple polarisation dependent intensity measurements may be obtained of radiation incident on the objective lens 702 (and thus the one or more retarders 108) at different angles of incidence.

Thus, it may be that the spectral modulator is to spectrally modulate the linear polarisation state of the received radiation to provide the received radiation with a plurality of polarised spectral modulation profiles which are offset in phase from each other, each of which is associated with a different linear polarisation angle, and that the apparatus is to additionally modulate the polarisation of the received radiation in one or more other domains, such as the angular, temporal and/or spatial domains. In this case, the polarised spectral modulation profiles to which the radiation detected by the detectors conform may be provided by the said spectral modulation, while the additional modulation helps to improve the accuracy with which radiation conforming to those profiles can be measured. Modulating polarisation of radiation in more than one modulation domain (e.g. angle of incidence, frequency, spatial, time) helps to remove systematic noise/interference from the measurements. For example, there may be large systematic errors for individual groups of pixels (e.g. if there are dead pixels in particular groups). When an additional (e.g. angular, spatial or temporal polarisation) stage of modulation is applied over the field of view, systematic differences for all pixels with the same polarisation filtering can be readily removed or at least reduced. In addition, if there is a priori knowledge about the scene being imaged, e.g. that the signal should vary smoothly over the field of view, this can be used to correct for local pixel effects. Thus, it may be that the controller 120 is configured to remove or reduce systematic errors from the gas detection measurements depending on a combination of polarisation modulations in different domains. For example, the controller may be configured to reduce or remove systematic errors from the polarisation-dependent intensity measurements, or fractional polarisation measurements from which the presence of gas may be determined, depending on the said additional modulation.

As mentioned above, an additional spatial modulation provided by a plurality of groups of radiation detectors detecting radiation output from the one or more retarders filtered for respective linear polarisation states, which may vary periodically across the focal plane, can be used by the controller 120 to remove or reduce systematic errors in the gas detection measurements. By detecting the received radiation, and thus the presence of gas, across the focal plane with uniform or smoothly varying polarisation, additional information is provided as compared to merely combining pixel values from a particular group to determine the presence of the gas, of which any two may be erroneous. As discussed above, additional information can additionally or alternatively be provided by an additional polarisation modulation in the angular or time domains which allows systematic errors to be mitigated by the controller 120.

In all of the above described embodiments, the fractional linear polarisation may be relatively small ($\sim 10^{-3}$) and hence steps may be taken to mitigate systematic effects that may result in erroneous measurements. As discussed, additional spatial, angular or temporal stages of modulation may be added to the apparatus to reduce systematic effects. The additional stages of modulation are not essential to the present disclosure and may only enhance the performance of the apparatus.

Any of the above embodiments may be used in a remote atmospheric trace gas monitoring system for capturing radiation which has passed through the atmosphere at different angles and comparing them.

Figure 8:
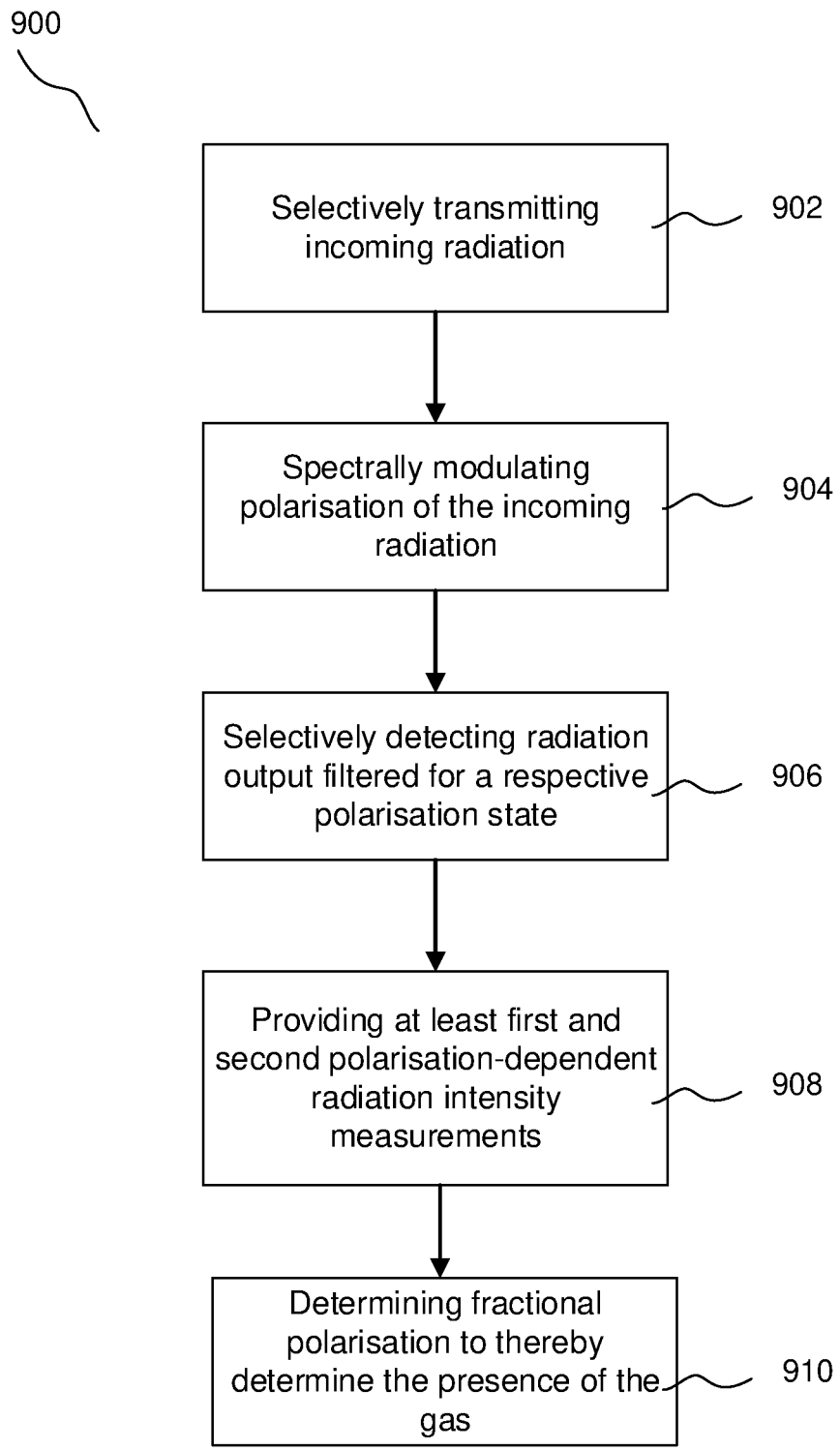
FIG. 8 is a flow chart schematically illustrating a method for determining the presence of a gas.

FIG. 8 is a flow chart schematically illustrating a method for determining the presence of a gas using an apparatus as described in any one of the above embodiments.

At 902, received radiation within a selected frequency range may be selectively transmitted, e.g. by a filter. An absorption spectrum of a gas may have a plurality of lines offset in frequency from each other within the selected frequency range. The selective transmission may be performed using a filter with a suitable transmission spectrum, for example a bandpass filter 121 optionally in combination with one or more birefringent filter stages 125. At 904, the polarisation of received radiation may be spectrally modulated within the selected frequency range. The polarisation of received radiation may be spectrally modulated in accordance with a plurality of polarised spectral modulation profiles which may be offset in phase from each other. The spectral modulation may be performed by one or more retarders.

At 906, at least a portion of the spectrally modulated radiation may be selectively detected which may be filtered for a respective polarisation state. The detected radiation may conform to each of at least first and second of the said polarised spectral modulation profiles.

At 908, at least first and second polarisation-dependent radiation intensity measurements may be provided that may correspond to each of at least first and second of the said polarised spectral modulation profiles respectively. The at least first and second polarisation-dependent radiation intensity measurements may be detected using a radiation detection apparatus 112.

At 910, the presence of a gas may be determined based on the at least first and second polarisation dependent radiation intensity measurements. This may comprise determining the fractional linear polarisation based on the at least first and second polarisation dependent radiation intensity measurements. The method may further include determining a relative absorption strength of the gas. The method may further include determining a concentration of the gas by comparing the determined fractional linear polarisation to one or more calibration references.

It will be understood that any number of polarisation dependent intensity measurements (preferably any number greater than one) may be made from which the presence of the gas can be determined, each of the polarisation dependent intensity measurements corresponding to a respective polarised spectral modulation profile of the plurality of polarised spectral modulation profiles in accordance with which the spectral modulator 115 modulates the radiation.

Although the linear polarisers described above each receive from the one or more retarders radiation having a plurality of linear polarisation components and having a single output to provide radiation having a single predefined linear polarisation to a respective detector, it will be understood that in some embodiments polarising beam splitters may additionally or alternatively be provided, the polarising beam splitters each receiving from the one or more retarders radiation having a plurality of linear polarisation components and providing at separate outputs polarised radiation at different predefined (e.g. orthogonal) linear polarisations to respective detectors.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C).

The invention claimed is:

1. Apparatus for determining presence of a gas, the apparatus comprising:
   one or more retarders to spectrally modulate polarisation of received radiation in accordance with a plurality of polarised spectral modulation profiles which are offset in phase from each other, the radiation output from the one or more retarders comprising radiation having polarisation spectrally modulated in accordance with the said plurality of polarised spectral modulation profiles in a common beam of radiation;

one or more polarisers; and radiation detectors to detect radiation output from the one or more retarders filtered for respective polarisation states by the one or more polarisers, the detectors selectively and separately detecting on different detectors at the same time polarised radiation conforming to each of at least first and second of the said polarised spectral modulation profiles to thereby provide at least respective first and second polarisation-dependent radiation intensity measurements from which the presence of the gas can be determined;

wherein the said polarised spectral modulation profiles have alternating maxima and minima which are substantially periodic with frequency of radiation within a selected frequency range, the frequency spacing between successive maxima being substantially equal to the frequency spacing between peaks of a pair of spectral features of the gas within the selected frequency range.

2. The apparatus of claim 1 further comprising a filter to selectively transmit incoming radiation having a frequency within the selected frequency range, the gas having a plurality of spectral features offset in frequency from each other within the selected frequency range.

3. The apparatus of claim 2, wherein the frequency spacing between successive maxima of the first polarised spectral modulation profile is substantially equal to the frequency spacing between peaks of a pair of spectral features of the gas within the selected frequency range, and wherein the respective maxima substantially overlap with the respective spectral features of the gas corresponding to the said peaks in the selected frequency range.

4. The apparatus of claim 2, wherein the first polarised spectral modulation profile is substantially 180° out of phase with the second polarised spectral modulation profile, and wherein the second polarised spectral modulation profile has successive maxima the frequency spacing between which is substantially equal to the frequency spacing between peaks of a pair of spectral features of the gas within the selected frequency range, and wherein the respective maxima of the second polarised spectral modulation profile substantially do not overlap with the respective peaks of the spectral features of the gas in the selected frequency range.

5. The apparatus according to claim 1, wherein the one or more retarders comprise one or more retarder plates and a quarter wave plate.

6. The apparatus according to claim 1, wherein the plurality of polarised spectral modulation profiles comprises at least three polarised spectral modulation profiles offset in phase from each other.

7. The apparatus according to claim 6 wherein the plurality of polarised spectral modulation profiles comprises at least four polarised spectral modulation profiles offset in phase from each other.

8. The apparatus according to claim 7 wherein the detectors selectively and separately detect on different detectors at the same time polarised radiation conforming to each of at least first, second, third and fourth of the said polarised spectral modulation profiles to thereby provide at least respective first, second, third and fourth polarisation-dependent radiation intensity measurements from which the presence of the gas can be determined.

9. The apparatus according to claim 8 wherein respective ones of the first, second, third and fourth polarised spectral modulation profiles which are adjacent to each other in phase are offset in phase from each other by substantially 90°.

10. The apparatus according to claim 6, wherein the detectors selectively and separately detect on different detectors at the same time polarised radiation conforming to each of at least first, second and third of the said polarised spectral modulation profiles to thereby provide at least respective first, second and third polarisation-dependent radiation intensity measurements from which the presence of the gas can be determined.

11. The apparatus according to claim 10 wherein respective ones of the first, second and third polarisation-dependent spectral modulation profiles which are adjacent to each other in phase are offset in phase from each other by substantially 120°.

12. The apparatus of claim 6, further comprising a filter to selectively transmit incoming radiation having a frequency within a selected frequency range, the gas having a plurality of spectral features offset in frequency from each other within the selected frequency range, wherein the respective maxima of the polarised spectral modulation profiles to which the radiation selectively detected by the detectors conform substantially do not overlap with the respective peaks of spectral features of the gas in the selected frequency range.

13. The apparatus according to claim 1, wherein the one or more retarders are to spectrally modulate the linear polarisation state of the received radiation to provide the received radiation with a plurality of polarised spectral modulation profiles which are offset in phase from each other, each of which is associated with a different linear polarisation angle.

14. The apparatus according to claim 1, wherein the one or more retarders are to spectrally modulate the linear polarisation state of the received radiation in accordance with different polarised spectral modulation profiles for different angles of incidence of the radiation on the one or more retarders.

15. The apparatus according to claim 1, wherein the one or more retarders comprise a temporal polarisation modulator to vary the polarisation state of the radiation output from the one or more retarders with respect to time.

16. The apparatus according to claim 1, wherein the detected radiation conforming to at least one of the said at least first and second polarised spectral modulation profiles is radiation filtered for a first linear polarisation angle and wherein the detected radiation conforming to at least one of the said at least first and second polarised spectral modulation profiles is radiation filtered for a second linear polarisation angle different from the first linear polarisation angle.

17. The apparatus according to claim 1, wherein the detected radiation conforming to at least one of the at least first and second polarised spectral modulation profiles is radiation polarised at a first linear polarisation angle which was incident on a first of the said one or more retarders at a first angle of incidence, and wherein the detected radiation conforming to at least one of the at least first and second polarised spectral modulation profiles is radiation polarised at the said first linear polarisation angle which was incident on the said first of the said one or more retarders at a second angle of incidence different from the first angle of incidence.

18. The apparatus according to claim 1, comprising a plurality of linear polarisers, each to receive radiation having spectrally modulated polarisation from the one or more retarders and output linearly polarised radiation to a respective radiation detector of the said radiation detectors.

19. A method for determining presence of a gas, the method comprising:

one or more retarders spectrally modulating polarisation of received linearly polarised radiation in accordance with a plurality of polarised spectral modulation profiles which are offset in phase from each other, the radiation output from the one or more retarders comprising radiation having polarisation spectrally modulated in accordance with the said plurality of polarised spectral modulation profiles in a common beam of radiation; and radiation detectors detecting radiation output from the one or more retarders filtered for respective polarisation states by one or more polarisers, the radiation detectors selectively and separately detecting on different detectors at the same time polarised radiation conforming to each of at least first and second of the said polarised spectral modulation profiles to thereby provide at least respective first and second polarisation-dependent radiation intensity measurements, and determining the presence of the gas based on the at least first and second polarisation dependent radiation intensity measurements;

wherein the said polarised spectral modulation profiles have alternating maxima and minima which are substantially periodic with frequency of radiation within a selected frequency range, the frequency spacing between successive maxima being substantially equal to the frequency spacing between peaks of a pair of spectral features of the gas within the selected frequency range.

\* \* \* \* \*